(12) United States Patent
Zheng

(10) Patent No.: US 10,666,977 B2
(45) Date of Patent: May 26, 2020

(54) METHODS AND APPARATUSES FOR CODING AND DECODING DEPTH MAP

(71) Applicant: Huawei Technologies Co., Ltd., Shenzhen, Guangdong (CN)

(72) Inventor: Xiaozhen Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 964 days.

(21) Appl. No.: 14/880,094

(22) Filed: Oct. 9, 2015

(65) Prior Publication Data

US 2016/0037185 A1 Feb. 4, 2016

Related U.S. Application Data

(63) Continuation of application No. PCT/CN2014/075239, filed on Apr. 14, 2014.

(30) Foreign Application Priority Data

Apr. 12, 2013 (CN) .......................... 2013 1 0127421
Apr. 19, 2013 (CN) .......................... 2013 1 0138110

(51) Int. Cl.
*H04N 19/61* (2014.01)
*H04N 19/159* (2014.01)
(Continued)

(52) U.S. Cl.
CPC .......... *H04N 19/61* (2014.11); *H04N 19/159* (2014.11); *H04N 19/182* (2014.11); *H04N 19/50* (2014.11);
(Continued)

(58) Field of Classification Search
CPC .... H04N 19/597; H04N 19/593; H04N 19/61; H04N 19/182; H04N 19/50; H04N 19/159
See application file for complete search history.

(56) References Cited

U.S. PATENT DOCUMENTS

2007/0005795 A1   1/2007 Gonzalez
2012/0020580 A1   1/2012 Sasai
(Continued)

FOREIGN PATENT DOCUMENTS

CN   1402852 A    3/2003
CN   101969561 A  2/2011
(Continued)

OTHER PUBLICATIONS

Gerhard Tech, et al., "3D-HEVC Test Model 3", Joint Collaborative Team on 3D Video Coding Extension Development of ITU-T SG 16 WP 3 and ISO/IEC JTC 1/SC 29/WG11, Jan. 17-23, 2013, 51 pages.
(Continued)

*Primary Examiner* — Mohammed Jebari
(74) *Attorney, Agent, or Firm* — Conley Rose, P.C.

(57) ABSTRACT

Embodiments of the present invention provide methods and devices for coding and decoding a depth map, including: determining to perform simplified depth coding (SDC) decoding according to a flag of an SDC mode; determining a size of an image block and a maximum prediction size; determining an intra-frame prediction mode; in a case in which the size of the image block is greater than the maximum prediction size, splitting the image block to obtain N split image blocks; and performing the SDC decoding on the N split image blocks by using the intra-frame prediction mode. In this way, processing efficiency of coding and decoding a depth map can be improved.

26 Claims, 9 Drawing Sheets

(51) Int. Cl.
*H04N 19/182* (2014.01)
*H04N 19/50* (2014.01)
*H04N 19/593* (2014.01)
*H04N 19/597* (2014.01)

(52) U.S. Cl.
CPC ......... *H04N 19/593* (2014.11); *H04N 19/597* (2014.11)

(56) References Cited

U.S. PATENT DOCUMENTS

2013/0034155 A1  2/2013  Min et al.
2014/0253682 A1* 9/2014  Zhang ................ H04N 13/0048
                                                            348/43

FOREIGN PATENT DOCUMENTS

| CN | 102301720 A | 12/2011 |
| CN | 102714583 A | 10/2012 |
| CN | 102790892 A | 11/2012 |
| CN | 102934436 A | 2/2013 |
| CN | 103237216 A | 8/2013 |
| EP | 2 547 107 A2 | 1/2013 |

OTHER PUBLICATIONS

Byung Tae Oh, et al., "3D-CE6.h related results on Improved Simple Depth Coding", Joint Collaborative Team on 3D Video Coding Extension Development of ITU-T SG 16 WP3 and ISO/IEC JTC 1/SC 29/WG11, Jan. 17-23, 2013, 4 pages.

Fabian Jager, "3D-CE6.h related: Model-based Intra Coding for Depth Maps using a Depth Lookup Table", RWTH Aachen University, Joint Collaborative Team on 3D Video Coding Extension Development of ITU-T SG 16 WP 3 and ISO/IEC JTC 1/SC 29/WG11, Jul. 16-20, 2012, 8 pages.

Xiaozhen Zheng, et al., "CE6.H related: Simplification of SDC signalling", HiSilicon Technologies Co., Ltd., Joint Collaborative Team on 3D Video Coding Extension Development of ITU-T SG 16 WP 3 and ISO/IEC JTC 1/SC 29/WG11, Jan. 17-23, 2013, 9 pages.

Fabian Jager, "3D-CE6.h : Simplified Depth Coding with an optional Depth Lookup Table", RWTH Aachen University, Joint Collaborative Team on 3D Video Coding Extension Development of ITU-T SG 16 WP 3 and ISO/IEC JTC 1/SC 29/WG11, Oct. 13-19, 2012, 16 pages.

Xiaozhen Zheng et al., "Reference samples sub-sampling for SDC and DMM", Joint Collaborative Team on 3D Video Coding Extension Development of ITU-T SG 16 WP3 and ISO/IEC JTC 1/SC 29/WG 11, Jan. 17-23, 2013, 5 pages.

Xiaozhen Zheng, "CE6.H related: Reference samples sub-sampling for SDC and DMM", HiSilicon Technologies Co., Ltd. 11 pages.

Gerhard Tech et al, "3D-HEVC Test Model 2," Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, JCT3V-B1005_d0, 118 pages.

* cited by examiner

METHODS AND APPARATUSES FOR CODING AND DECODING DEPTH MAP

CROSS-REFERENCE TO RELATED APPLICATION

This application is a continuation of International Application No. PCT/CN2014/075239 filed on Apr. 14, 2014, which claims priority to Chinese Patent Application No. 201310127421.6, filed on Apr. 12, 2013 and Chinese Patent Application No. 201310138110.X, filed on Apr. 19, 2013, all of which are hereby incorporated by reference in their entireties.

TECHNICAL FIELD

Embodiments of the present invention relate to the field of wireless communications technologies, and in particular, to methods and apparatuses for coding and decoding a depth map.

BACKGROUND

Three-dimensional video images are classified into two types: a view image and a depth map. The view image includes information, such as color information, of the image itself. The depth map includes depth information, such as contour information, of the view image. To reduce bandwidth occupied by video transmission during transmission of the three-dimensional video image, coding processing needs to be performed on the view image and the depth map so as to reduce a data size of the three-dimensional video image.

Simplified depth coding (SDC) is a method for coding a depth map. In a case in which an image block of the depth map on which the SDC needs to be performed is determined, a coder needs to select an intra-frame prediction mode and determine prediction data of the image block according to the intra-frame prediction mode. A prediction mode that can be selected by the coder may be any one of the following modes: a direct current mode, a planar (Planar) mode, and a depth modeling mode (Depth Modeling Mode, DMM), where the DMM includes an explicit wedgelet (Wedgelet) mode, an intra-predicted wedgelet partitioning mode, an inter-component prediction of wedgelet partitioning mode, and an inter-component prediction of contour partitioning mode. When determining the prediction data of the image block according to the intra-frame prediction mode, the coder needs to determine a size of the image block. When the SDC is performed on the image block, a size of a prediction block on which SDC is performed needs to be consistent with the size of the image block. However, in the prior art, a maximum prediction size (that is, a maximum size of the image block on which the SDC is performed) is limited, and the size of the image block may be greater than the maximum prediction size, for example, the size of the image block is 64×64, whereas the maximum prediction size is 32×32. In this case, when SDC is performed on the image block, an image block of a size greater than the maximum prediction size needs to be introduced into a coding and decoding system, which may increase design overheads of the coding and decoding system. In addition, the DMM does not support the image block of a size greater than the maximum prediction size. Therefore, in a case in which the size of the image block is greater than the maximum prediction size, the DMM cannot be selected to perform the SDC on the image block, thereby resulting in a decrease in coding efficiency.

SUMMARY

Embodiments of the present invention provide methods and apparatuses for coding and decoding a depth map, which may improve processing efficiency of reconstructing, by a decoder, an image block of a depth map on which SDC coding is performed.

According to a first aspect, an embodiment of the present invention provides a method for decoding a depth map, where the method includes:

obtaining a flag of simplified depth coding SDC, and determining to perform SDC decoding;

determining a size of an image block and a maximum prediction size;

determining an intra-frame prediction mode of the image block;

when the size of the image block is greater than the maximum prediction size, splitting the image block to obtain N split image blocks, where a size of the N split image blocks is the same as the maximum prediction size; and performing the SDC decoding on the N split image blocks by using the intra-frame prediction mode.

With reference to the first aspect, in a first possible implementation manner, the intra-frame prediction mode that is used when the SDC is performed on the image block is a depth modeling mode DMM or a planar mode or a direct current mode.

With reference to the first aspect or the first possible implementation manner, in a second possible implementation manner, the splitting the image block to obtain N split image blocks according to the size of the image block and the maximum prediction size, where a size of each of the N split image blocks is the same as the maximum prediction size includes:

splitting the image block to obtain split image blocks according to the size of the image block and the maximum prediction size, where if a size of the split image blocks is the same as the maximum prediction size, the N split image blocks are obtained; or if a size of the split image blocks is greater than the maximum prediction size, continuing to split the split image blocks until the size of the split image blocks is the same as the maximum prediction size, and the N split image blocks are obtained.

With reference to the first aspect or either one of the foregoing possible implementation manners, in a third possible implementation manner, the performing the SDC decoding on the N split image blocks by using the intra-frame prediction mode includes:

obtaining N residuals by means of decoding when performing the SDC decoding on the N split image blocks.

With reference to the third possible implementation manner, in a fourth possible implementation manner, the performing the SDC decoding on the N split image blocks by using the intra-frame prediction mode includes:

determining an average value of prediction data of the N image blocks by using the intra-frame prediction mode that is used when the SDC is performed on the image block; and determining reconstruction values of the N image blocks according to the average value of the prediction data of the N image blocks and the N residuals, so as to complete performing the SDC decoding on the N image blocks.

With reference to the fourth possible implementation manner, in a fifth possible implementation manner, the determining an average value of prediction data of the N image blocks by using the intra-frame prediction mode that is used when the SDC is performed on the image block includes:

obtaining the prediction data by using the intra-frame prediction mode that is used when the SDC is performed on the image block; and determining the average value of the prediction data of the N image blocks by using the following formula:

$$PV_i = \Sigma PPix_i[x,y]/\text{sumOfPPix, where}$$

$PV_i$ is an average value of prediction data of the $i^{th}$ image block among the N image blocks, $PPix_i[x,y]$ is a pixel value in prediction data whose coordinates are [x,y] in the $i^{th}$ image block, and sumOfPPix is the number of pixels in the $i^{th}$ image block.

With reference to the fourth possible implementation manner, in a sixth possible implementation manner, the determining reconstruction values of the N image blocks according to the average value of the prediction data of the N image blocks and the residuals of the N image blocks includes:

determining the reconstruction values of the N image blocks by using the following formula:

$$R_i = PV_i + S_i, \text{ where}$$

$R_i$ is a reconstruction value of the $i^{th}$ image block among the N image blocks, $PV_i$ is an average value of prediction data of the $i^{th}$ image block among the N image blocks, and $S_i$ is a residual of the $i^{th}$ image block among the N image blocks.

According to a second aspect, an embodiment of the present invention provides a method for coding a depth map, where the method includes:

determining a size of an image block and a maximum prediction size;

determining an intra-frame prediction mode;

when the size of the image block is greater than the maximum prediction size, splitting the image block to obtain N split image blocks according to the size of the image block and the maximum prediction size, where a size of the N split image blocks is the same as the maximum prediction size; and performing simplified depth coding SDC on the N split image blocks by using the intra-frame prediction mode.

With reference to the second aspect, in a first possible implementation manner, the intra-frame prediction mode is a depth modeling mode DMM or a planar mode or a direct current mode.

With reference to the second aspect or the first possible implementation manner, in a second possible implementation manner, the splitting the image block to obtain N split image blocks according to the size of the image block and the maximum prediction size, where a size of the N split image blocks is the same as the maximum prediction size includes:

splitting the image block to obtain split image blocks according to the size of the image block and the maximum prediction size, where if a size of the split image blocks is the same as the maximum prediction size, the N split image blocks are obtained; or if a size of the split image blocks is greater than the maximum prediction size, continuing to split the split image blocks until the size of the split image blocks is the same as the maximum prediction size, and the N split image blocks are obtained.

With reference to the second aspect or either one of the foregoing possible implementation manners, in a third possible implementation manner, the performing simplified depth coding SDC on the N split image blocks by using the intra-frame prediction mode includes:

determining an average value of prediction data of the N split image blocks by using the intra-frame prediction mode;

determining an average value of raw data of the N split image blocks;

determining residuals of the N split image blocks according to the average value of the prediction data of the N split image blocks and the average value of the raw data of the N split image blocks; and coding the residuals of the N split image blocks, so as to complete performing simplified depth coding SDC on the N split image blocks.

With reference to the third possible implementation manner, in a fourth possible implementation manner, the determining an average value of prediction data of the N split image blocks by using the intra-frame prediction mode includes:

determining the prediction data of the N split image blocks by using the intra-frame prediction mode; and determining the average value of the prediction data of the N split image blocks by using the following formula:

$$PV_i = \Sigma PPix_i[x,y]/\text{sumOfPPix, where}$$

$PV_i$ is an average value of prediction data of the $i^{th}$ image block among the N split image blocks, $PPix_i[x,y]$ is a pixel value in prediction data whose coordinates are [x,y] in the $i^{th}$ image block, and sumOfPPix is the number of pixels in the $i^{th}$ image block.

With reference to the third possible implementation manner, in a fifth possible implementation manner, the determining an average value of raw data of the N split image blocks includes:

determining the average value of the raw data of the N split image blocks by using the following formula:

$$BV_i = \Sigma BPix_i[x,y]/\text{sumOfBPix, where}$$

$BV_i$ is an average value of raw data of the $i^{th}$ image block among the N split image blocks, $BPix_i[x,y]$ is a pixel value in raw data whose coordinates are [x,y] in the $i^{th}$ image block, and sumOfBPix is the number of pixels in the $i^{th}$ image block.

With reference to the third possible implementation manner, in a sixth possible implementation manner, the determining residuals of the N split image blocks according to the average value of the prediction data of the N split image blocks and the average value of the raw data of the N split image blocks includes:

determining the residuals of the N split image blocks by using the following formula:

$$S_i = PV_i - BV_i, \text{ where}$$

$S_i$ is a residual of the $i^{th}$ image block among the N split image blocks, $PV_i$ is an average value of prediction data of the $i^{th}$ image block among the N split image blocks, and $BV_i$ is an average value of raw data of the $i^{th}$ image block among the N split image blocks.

With reference to the second aspect or the first possible implementation manner, in a seventh possible implementation manner, the method further includes:

when the size of the image block is less than or equal to the maximum prediction size, performing simplified depth coding SDC on the image block by using the intra-frame prediction mode.

With reference to the second aspect or any one of the foregoing possible implementation manners, in an eighth possible implementation manner:

the size of the image block is a size of a transform block; or the maximum prediction size is a maximum transform size.

According to a third aspect, an embodiment of the present invention provides an apparatus for decoding a depth map, where the decoding apparatus includes:

a determining unit, configured to determine, according to a flag of simplified depth coding SDC, to use SDC decoding, where the determining unit is further configured to determine a size of an image block and a maximum prediction size;

the determining unit is further configured to determine an intra-frame prediction mode that is used when SDC is performed on the image block; and the determining unit is further configured to split the image block to obtain N split image blocks according to the size of the image block and the maximum prediction size when the size of the image block is greater than the maximum prediction size, where a size of the N split image blocks is the same as the maximum prediction size;

a decoding unit, configured to perform the SDC decoding on the N split image blocks by using the intra-frame prediction mode; and a reconstruction unit, configured to reconstruct the image block according to a result of the SDC decoding performed on the N split image blocks.

With reference to the third aspect, in a first possible implementation manner, the determining unit is specifically configured to split the image block to obtain split image blocks according to the size of the image block and the maximum prediction size, where if a size of the split image blocks is the same as the maximum prediction size, the N split image blocks are obtained; or if a size of the split image blocks is greater than the maximum prediction size, continue to split the split image blocks until the size of the split image blocks is the same as the maximum prediction size, and the N split image blocks are obtained.

With reference to the third aspect or the first possible implementation manner, in a second possible implementation manner, the decoding unit is specifically configured to obtain N residuals by means of decoding when performing the SDC decoding on the N split image blocks.

With reference to the second possible implementation manner, in a third possible implementation manner, the decoding unit is specifically configured to determine an average value of prediction data of the N image blocks and determine residuals of the N image blocks by using the intra-frame prediction mode that is used when the SDC is performed on the image block; and determine reconstruction values of the N image blocks according to the average value of the prediction data of the N image blocks and the N residuals, so as to complete performing the decoding on the N image blocks.

With reference to the third possible implementation manner, in a fourth possible implementation manner, the decoding unit is specifically configured to determine the prediction data of the N image blocks by using the intra-frame prediction mode that is used when the SDC is performed on the image block; and determine the average value of the prediction data of the N image blocks by using the following formula:

$$PV_i = \Sigma PPix_i[x,y]/\text{sumOfPPix}, \text{ where}$$

$PV_i$ is prediction data of the $i^{th}$ image block among the N image blocks, $PPix_i[x,y]$ is a pixel value in prediction data whose coordinates are $[x,y]$ in the $i^{th}$ image block, and sumOfPPix is the number of pixels in the $i^{th}$ image block.

With reference to the fourth possible implementation manner, in a fifth possible implementation manner, the decoding unit is specifically configured to determine the reconstruction values of the N image blocks by using the following formula:

$$R_i = PV_i + S_i, \text{ where}$$

$R_i$ is a reconstruction value of the $i^{th}$ image block among the N image blocks, $PV_i$ is an average value of prediction data of the $i^{th}$ image block among the N image blocks, and $S_i$ is a residual of the $i^{th}$ image block among the N image blocks.

According to a fourth aspect, an embodiment of the present invention provides an apparatus for coding a depth map, where the coding apparatus includes:

a determining unit, configured to determine a size of an image block and a maximum prediction size, where the determining unit is further configured to determine an intra-frame prediction mode; and the determining unit is further configured to split the image block to obtain N split image blocks according to the size of the image block and the maximum prediction size when the size of the image block is greater than the maximum prediction size, where a size of the N split image blocks is the same as the maximum prediction size; and a coding unit, configured to perform simplified depth coding SDC on the N split image blocks by using the intra-frame prediction mode.

With reference to the fourth aspect, in a first possible implementation manner:

the determining unit is specifically configured to split the image block to obtain split image blocks according to the size of the image block and the maximum prediction size, where if a size of the split image blocks is the same as the maximum prediction size, the N split image blocks are obtained; or if a size of the split image blocks is greater than the maximum prediction size, continue to split the split image blocks until the size of the split image blocks is the same as the maximum prediction size, and the N split image blocks are obtained.

With reference to the fourth aspect or the first possible implementation manner, in a second possible implementation manner, the coding unit is specifically configured to determine an average value of prediction data of the N split image blocks by using the intra-frame prediction mode and determine an average value of raw data of the N split image blocks; determine residuals of the N split image blocks according to the average value of the prediction data of the N split image blocks and the average value of the raw data of the N split image blocks; and code the residuals of the N split image blocks, so as to complete performing simplified depth coding SDC on the N split image blocks.

With reference to the second possible implementation manner, in a third possible implementation manner, the coding unit is specifically configured to determine the prediction data of the N split image blocks by using the intra-frame prediction mode; and determine the average value of the prediction data of the N split image blocks by using the following formula:

$$PV_i = \Sigma PPix_i[x,y]/\text{sumOfPPix, where}$$

$PV_i$ is an average value of prediction data of the $i^{th}$ image block among the N split image blocks, $PPix_i[x,y]$ is a pixel value in prediction data whose coordinates are [x,y] in the $i^{th}$ image block, and sumOfPPix is the number of pixels in the $i^{th}$ image block.

With reference to the second possible implementation manner, in a fourth possible implementation manner, the coding unit is specifically configured to determine the average value of the raw data of the N split image blocks by using the following formula:

$$BV_i = \Sigma BPix_i[x,y]/\text{sumOfBPix, where}$$

$BV_i$ is an average value of raw data of the $i^{th}$ image block among the N split image blocks, $BPix_i[x,y]$ is a pixel value in raw data whose coordinates are [x,y] in the $i^{th}$ image block, and sumOfBPix is the number of pixels in the $i^{th}$ image block.

With reference to the second possible implementation manner, in a fifth possible implementation manner, the coding unit is specifically configured to determine the residuals of the N split image blocks by using the following formula:

$$S_i = PV_i - BV_i, \text{ where}$$

$S_i$ is a residual of the $i^{th}$ image block among the N split image blocks, $PV_i$ is an average value of prediction data of the $i^{th}$ image block among the N split image blocks, and $BV_i$ is an average value of raw data of the $i^{th}$ image block among the N split image blocks.

With reference to the fourth aspect, in a sixth possible implementation manner, the determining unit is further configured to, when the size of the image block is less than or equal to the maximum prediction size, perform simplified depth coding SDC on the image block according to the intra-frame prediction mode.

According to the embodiments of the present invention, when coding or decoding is performed on an image block on which SDC is performed, a same intra-frame prediction mode can be adopted to code and decode N image blocks that belong to the image block. In this way, processing efficiency of coding and decoding can be improved.

According to a fifth aspect, an embodiment of the present invention provides a method for decoding a depth map, where the method includes:

determining a size of an image block and a maximum prediction size;

in a case in which the size of the image block is greater than the maximum prediction size, determining that a signaling bit has N bit, and determining, according to the signaling bit, an intra-frame prediction mode that is used when the SDC is performed on the image block; and in a case in which the size of the image block is less than or equal to the maximum prediction size, determining that the signaling bits have M bits, and determining, according to the signaling bits, that a mode that is used when the SDC is performed on the image block is the direct current mode or the planar mode, where a value of M is greater than that of N.

With reference to the fifth aspect, in a first possible implementation manner, the intra-frame prediction mode is a direct current mode or a planar mode or a depth modeling mode DMM.

According to a sixth aspect, an embodiment of the present invention provides a method for coding a depth map, where the method includes:

determining a size of an image block and a maximum prediction size;

selecting an intra-frame prediction mode;

in a case in which the size of the image block is greater than the maximum prediction size, determining, when the SDC is performed on the image block, that N bit is used as a signaling bit that identifies the intra-frame prediction mode; or in a case in which the size of the image block is less than or equal to the maximum prediction size, determining, when the SDC is performed on the image block, that M bits are used as signaling bits that identify the intra-frame prediction mode, where a value of M is greater than that of N.

With reference to the sixth aspect, in a first possible implementation manner, the intra-frame prediction mode is a direct current mode or a planar mode or a depth modeling mode DMM.

According to a seventh aspect, an embodiment of the present invention provides an apparatus for decoding a depth map, where the decoding apparatus includes:

a determining unit, configured to determine a size of an image block and a maximum prediction size; and a decoding unit, configured to, in a case in which the size of the image block is greater than the maximum prediction size, determine that a signaling bit has N bit, and determine, according to the signaling bit, an intra-frame prediction mode that is used when the SDC is performed on the image block; and in a case in which the size of the image block is less than or equal to the maximum prediction size, determine that the signaling bits have M bits, and determine, according to the signaling bits, that a mode that is used when the SDC is performed on the image block is the direct current mode or the planar mode, where a value of M is greater than that of N.

According to an eighth aspect, an embodiment of the present invention provides an apparatus for coding a depth map, where the coding apparatus includes:

a determining unit, configured to determine a size of an image block and a maximum prediction size; and a coding unit, configured to determine an intra-frame prediction mode; where the coding unit is further configured to, in a case in which the size of the image block is greater than the maximum prediction size, determine, when the SDC is performed on the image block, that N bit is used as a signaling bit that identifies the intra-frame prediction mode; or in a case in which the size of the image block is less than or equal to the maximum prediction size, determine, when the SDC is performed on the image block, that M bits are used as signaling bits that identify the intra-frame prediction mode, where a value of M is greater than that of N.

According to a ninth aspect, an embodiment of the present invention provides a method for decoding a depth map, where the method includes:

determining a size of an image block and a maximum prediction size;

in a case in which the size of the image block is greater than the maximum prediction size, determining an intra-frame prediction mode that is used when the SDC is performed on the image block; and in a case in which the size of the image block is less than or equal to the maximum prediction size, determining that signaling bits have M bits, and determining, according to the signaling bits, an intra-frame prediction mode that is used when the SDC is performed on the image block.

With reference to the ninth aspect, in a first possible implementation manner, the intra-frame prediction mode is a direct current mode or a planar mode or a depth modeling mode DMM.

According to a tenth aspect, an embodiment of the present invention provides an apparatus for decoding a depth map, where the decoding apparatus includes:

a determining unit, configured to determine a size of an image block and a maximum prediction size; and a decoding unit, configured to, in a case in which the size of the image block is greater than the maximum prediction size, determine an intra-frame prediction mode that is used when the SDC is performed on the image block; and in a case in which the size of the image block is less than or equal to the maximum prediction size, determine that signaling bits have M bits; and determine, according to the signaling bits, an intra-frame prediction mode that is used when the SDC is performed on the image block.

With reference to the tenth aspect, in a first possible implementation manner, the intra-frame prediction mode is a direct current mode or a planar mode or a depth modeling mode DMM.

According to the methods provided in the embodiments of the present invention, when coding or decoding is performed on a depth map, the number of bits of signaling bits that are used to identify an intra-frame prediction mode can be reduced, thereby achieving objectives of reducing resources and accelerating coding and decoding.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
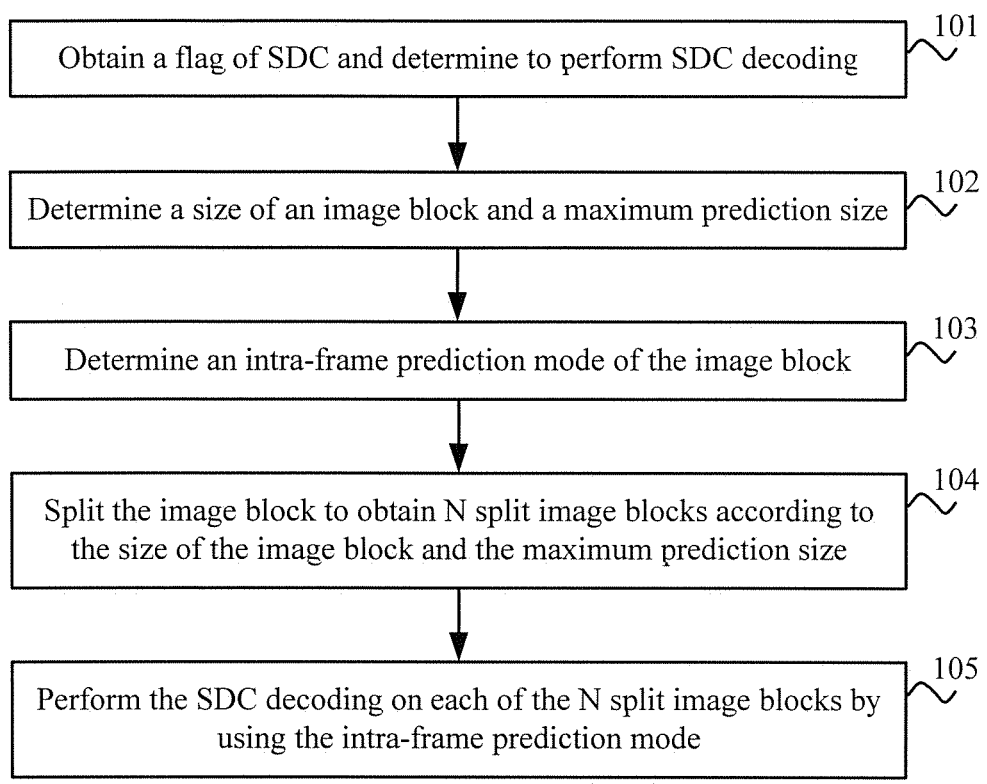
FIG. 1 is a schematic flowchart of a method for decoding a depth map according to an embodiment of the present invention.

FIG. 1 is a schematic flowchart of a method for decoding a depth map according to an embodiment of the present invention.

101. Obtain a flag of SDC and determine to perform SDC decoding.

102. Determine a size of an image block and a maximum prediction size.

103. Determine an intra-frame prediction mode of the image block.

Specifically, a prediction mode that can be used when the SDC is performed on the image block may be any one of the following modes: a direct current mode, a planar mode, and a depth modeling mode (Depth Modeling Mode, DMM), where the DMM includes an explicit wedgelet mode, an intra-predicted wedgelet partitioning mode, an inter-component prediction of wedgelet partitioning mode, and an inter-component prediction of contour partitioning mode.

104. In a case in which the size of the image block is greater than the maximum prediction size, split the image block to obtain N split image blocks according to the size of the image block and the maximum prediction size, where a size of each of the N split image blocks is the same as the maximum prediction size.

105. Perform the SDC decoding on each of the N split image blocks by using the intra-frame prediction mode.

According to the method shown in FIG. 1, when decoding is performed on an image block on which SDC is performed, a same intra-frame prediction mode can be adopted to decode N image blocks that belong to the image block. In this way, processing efficiency of reconstructing, by a decoder, an image block of a depth map on which SDC coding is performed can be improved.

Figure 2:
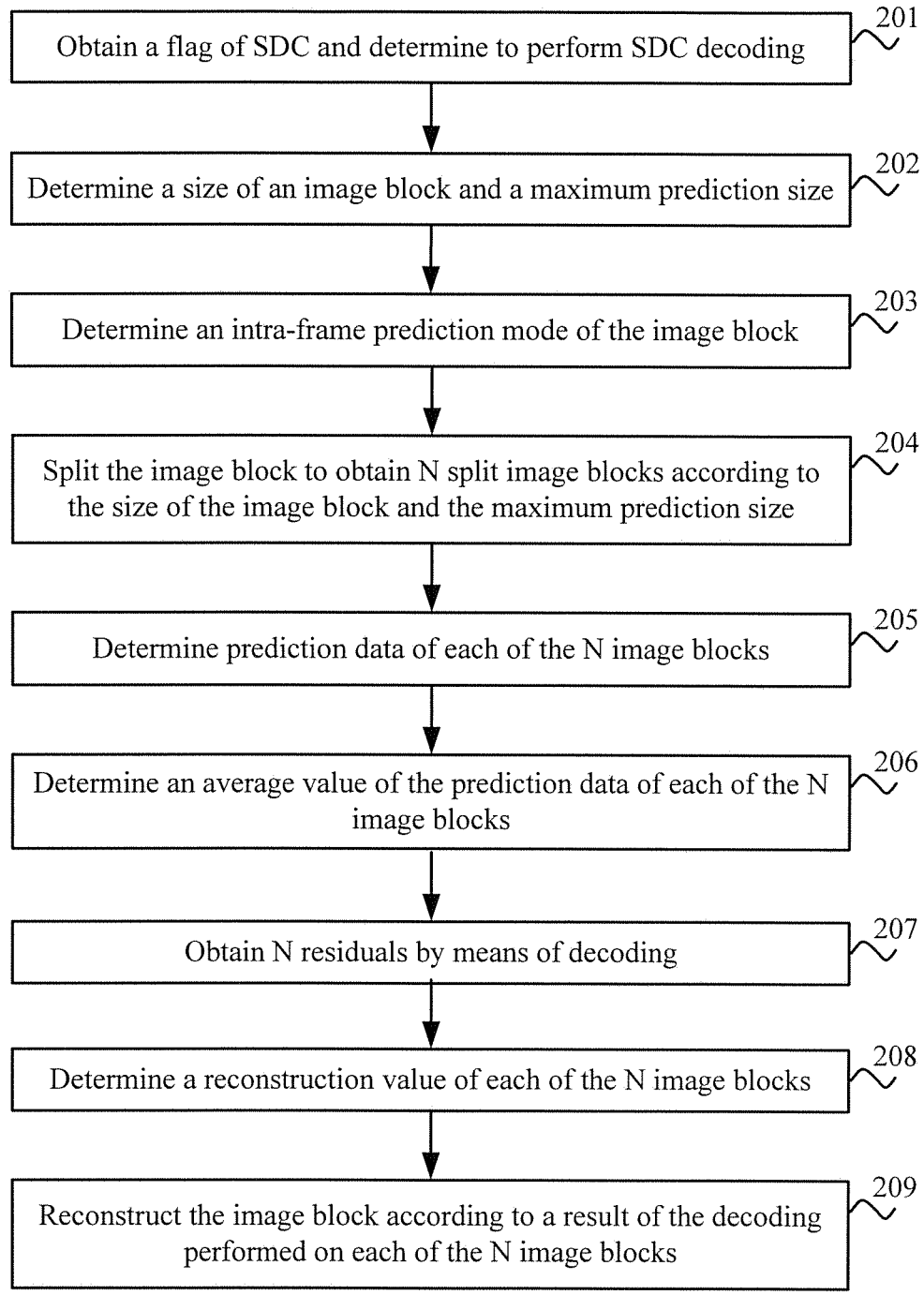
FIG. 2 is a schematic flowchart of a method for decoding a depth map according to an embodiment of the present invention.

FIG. 2 is a schematic flowchart of a method for decoding a depth map according to an embodiment of the present invention.

201. Obtain a flag of SDC and determine to perform SDC decoding.

202. Determine a size of an image block and a maximum prediction size.

203. Determine an intra-frame prediction mode of the image block.

Specifically, a prediction mode that can be used when the SDC is performed on the image block may be any one of the following modes: a direct current mode, a planar mode, and a depth modeling mode (Depth Modeling Mode, DMM), where the DMM includes an explicit wedgelet mode, an intra-predicted wedgelet partitioning mode, an inter-component prediction of wedgelet partitioning mode, and an inter-component prediction of contour partitioning mode.

204. In a case in which the size of the image block is greater than the maximum prediction size, split the image block to obtain N split image blocks according to the size of the image block and the maximum prediction size, where a size of each of the N split image blocks is the same as the maximum prediction size.

Optionally, it may be determined that N is a square of a ratio of the size of the image block to the maximum prediction size. For example, the size of the image block is 64, and the maximum prediction size is 32; in this case, the ratio between the two is 2, and a value of N is 4.

Optionally, during the splitting of the image block, the image block may also be split, in a recursive splitting manner, to obtain N prediction blocks. The image block is split to obtain split image blocks according to the size of the image block and the maximum prediction size. If a size of each of the split image blocks is the same as the maximum prediction size, the N split image blocks are obtained; or if a size of each of the split image blocks is greater than the maximum prediction size, the split image blocks continue to be split until the size of each of the split image blocks is the same as the maximum prediction size, and the N split image blocks are obtained.

Specifically, the size of the image block is compared with the maximum prediction size, and if the size of the image block is greater than the maximum prediction size, the image block is split into multiple image blocks of an equal size. Generally, the image block is split into four image blocks, where each of the split image blocks is half of the image block in width and height, or each of the split image blocks is the same as the image block in width and a quarter of the image block in height, or each of the split image blocks is the same as the image block in height and a quarter of the image block in width. Then a size of each of the multiple split image blocks is compared with the maximum prediction size, and if the size of the multiple split image blocks is greater than the maximum prediction size, the foregoing step is repeated, that is, each of the split image blocks is further split until a size of image blocks that are obtained by means of splitting is the same as the maximum prediction size, and the split image blocks whose size is the same as the maximum prediction size serve as image blocks that are used when the SDC is performed.

In the foregoing step, the size of the image block is obtained from a decoding process, and the maximum prediction size is obtained from a bitstream by decoding.

In addition, a prediction process of intra-frame coding is bound with a transform process of the intra-frame coding, and therefore intra-frame prediction may be performed based on a size of a transform block during the intra-frame prediction, that is, the size of the image block is consistent with the size of the transform block. Therefore, the size of the image block mentioned in the present invention may also be represented by the size of the transform block, and the maximum prediction size may also be represented by a maximum transform size. Specifically, it is supposed that log 2TrafoSize is the size of the image block, and Log 2MaxTrafoSize is the maximum prediction size, where both log 2TrafoSize and Log 2MaxTrafoSize are represented in a form of a logarithm of a block size, that is, the size of the image block equals 2 log 2TrafoSize, and the maximum prediction size equals 2 Log 2MaxTrafoSize. When 1 is subtracted from a value of log 2TrafoSize or Log 2MaxTrafoSize, it identifies that a corresponding block size is divided by 2. When log 2TrafoSize is greater than Log 2MaxTrafoSize, a current transform block is split into four transform blocks of a smaller size, where the size of each of the four transform blocks is log 2TrafoSize−1; then the foregoing splitting is performed on each of the split transform blocks according to Log 2MaxTrafoSize until it is determined that the value of log 2TrafoSize equals the value of Log 2MaxTrafoSize. In this case, the intra-frame prediction is performed based on Log 2MaxTrafoSize.

It may be understood that other manners may also be adopted to split the image block to obtain the N split image blocks, and the size of each of the N split image blocks is the same as the maximum prediction size. All these methods for splitting an image block fall within the protection scope of the present invention.

205. Determine prediction data of each of the N image blocks by using the intra-frame prediction mode that is used when the SDC is performed on the image block.

206. Repeatedly use a formula 2.1 until an average value of the prediction data of each of the N image blocks is determined.

$$PV_i = \Sigma PPix_i[x,y]/\text{sumOfPPix} \qquad 2.1, \text{where}$$

$PV_i$ is an average value of prediction data of the $i^{th}$ image block among the N image blocks, $PPix_i[x,y]$ is a pixel value in prediction data whose coordinates are [x,y] in the $i^{th}$ image block, and sumOfPPix is the number of pixels in the $i^{th}$ image block.

207. Obtain N residuals by means of decoding when the SDC decoding is performed on each of the N split image blocks.

Specifically, a coder codes a residual of the image block when performing the SDC coding and determines a data stream that includes the residual of the image block. In a case in which a decoder receives the data stream that includes the residual of the image block, the decoder decodes the data stream and determines a residual of each of the N image blocks that belong to the image block. It may be understood that step 207 may also be performed before step 206, which is not limited in the present invention.

208. Determine a reconstruction value of each of the N image blocks according to the average value of the prediction data of each of the N image blocks and the residual of each of the N image blocks, so as to complete performing the decoding on each of the N image blocks.

Specifically, a formula 2.2 may be repeatedly used until the reconstruction value of each of the N image blocks is determined.

$$R_i = PV_i + S_i \qquad 2.2, \text{where}$$

$R_i$ is a reconstruction value of the $i^{th}$ image block among the N image blocks, $PV_i$ is prediction data of the $i^{th}$ image block among the N image blocks, and $S_i$ is a residual of the $i^{th}$ image block among the N image blocks.

209. Reconstruct the image block according to a result of the decoding performed on each of the N image blocks. Specifically, determine, according to the reconstruction value of each of the N image blocks, a reconstructed image of the image block on which the SDC coding is performed.

It may be understood that step 204 to step 209 are performed in the case in which the size of the image block on which the SDC is performed is greater than the maximum prediction size. In a case in which the size of the image block on which the SDC is performed is less than or equal to the maximum prediction size, the decoder may directly use the intra-frame prediction mode to perform the SDC decoding on the image block.

According to the method shown in FIG. 2, when decoding is performed on an image block on which SDC is performed, a same intra-frame prediction mode can be adopted to decode N image blocks that belong to the image block. In this way, processing efficiency of reconstructing, by a decoder, an image block of a depth map on which SDC coding is performed can be improved.

Figure 3:
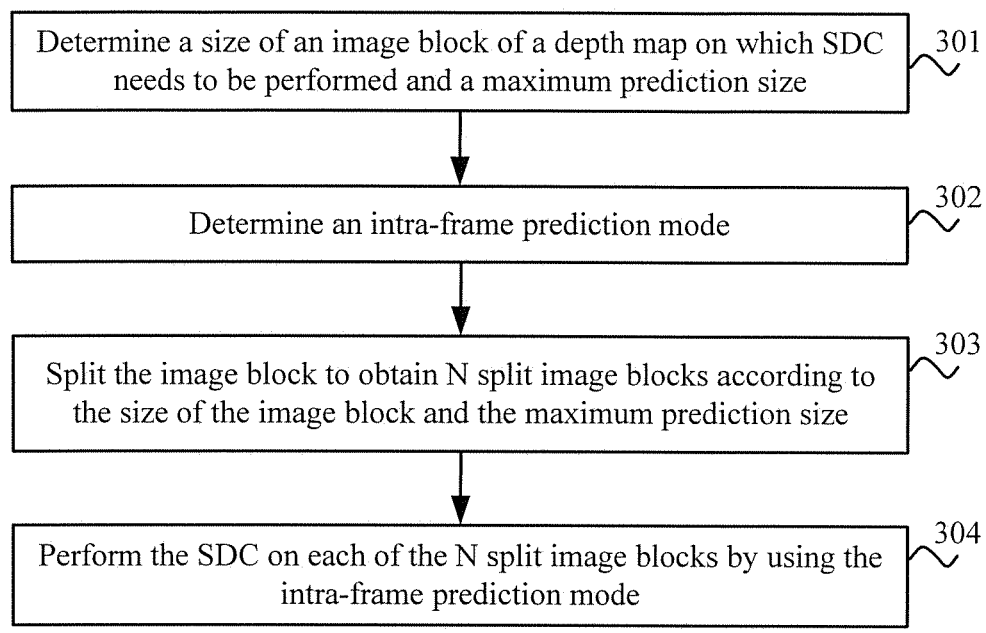
FIG. 3 is a schematic flowchart of a method for coding a depth map according to an embodiment of the present invention.

FIG. 3 is a schematic flowchart of a method for coding a depth map according to an embodiment of the present invention.

301. Determine a size of an image block and a maximum prediction size, where the image block is an image block of a depth map on which SDC needs to be performed.

302. Determine an intra-frame prediction mode.

Specifically, a prediction mode that can be used may be any one of the following modes: a direct current mode, a planar mode, and a depth modeling mode (Depth Modeling Mode, DMM), where the DMM includes an explicit wedgelet mode, an intra-predicted wedgelet partitioning mode, an inter-component prediction of wedgelet partitioning mode, and an inter-component prediction of contour partitioning mode.

303. In a case in which the size of the image block is greater than the maximum prediction size, split the image block to obtain N split image blocks according to the size of the image block and the maximum prediction size, where a size of each of the N split image blocks is the same as the maximum prediction size.

304. Perform the SDC on each of the N split image blocks by using the intra-frame prediction mode.

According to the method shown in FIG. 3, in the case in which the size of the image block is greater than the maximum prediction size, a same intra-frame prediction mode can be used to perform the SDC on each of the N split image blocks. In this way, efficiency of processing, by a coder, an image block of a depth map on which the SDC coding needs to be performed can be greatly improved.

Figure 4:
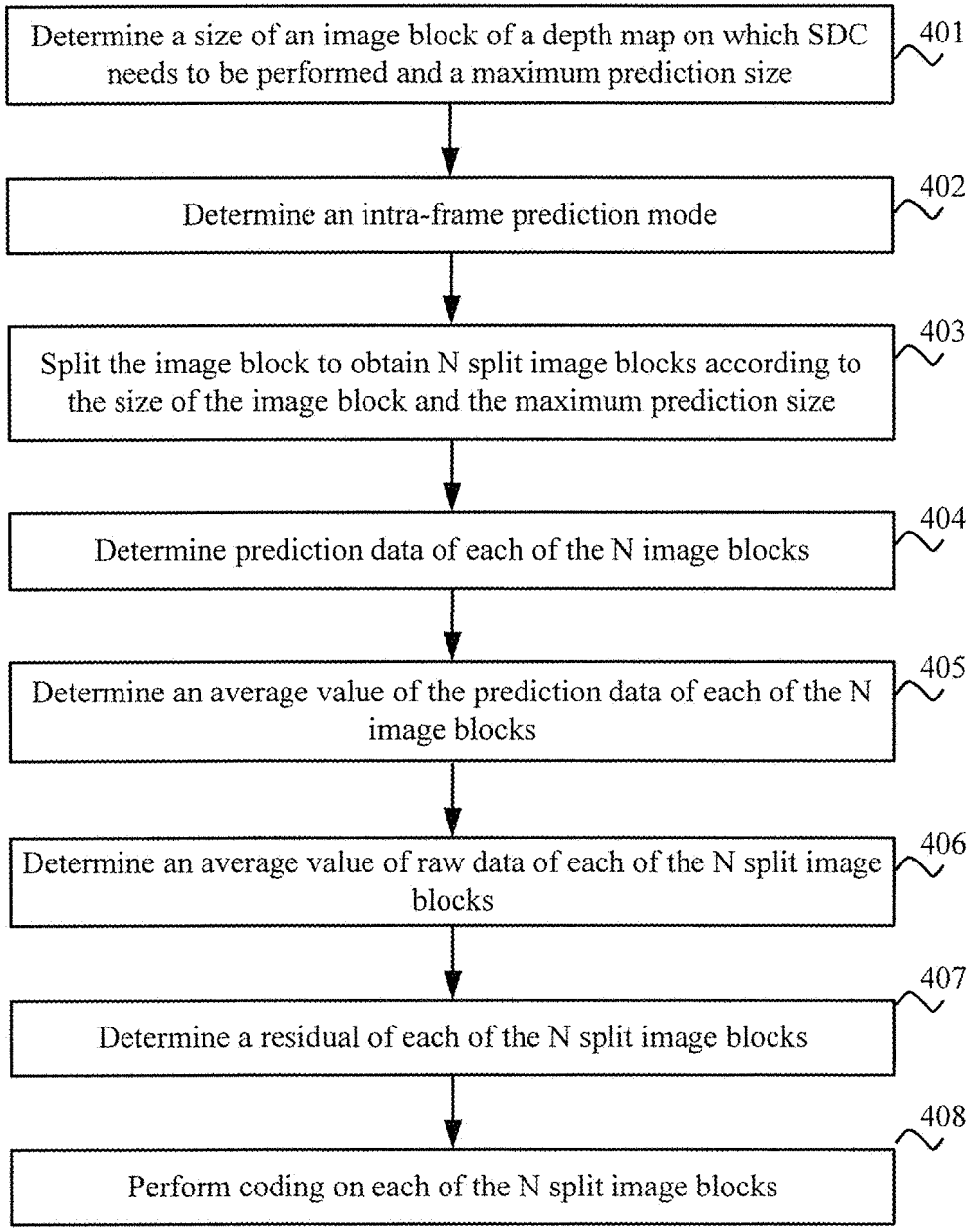
FIG. 4 is a schematic flowchart of a method for coding a depth map according to an embodiment of the present invention.

FIG. 4 is a schematic flowchart of a method for coding a depth map according to an embodiment of the present invention. FIG. 4 is a specific embodiment of the method for coding a depth map in FIG. 3.

401. Determine a size of an image block of a depth map on which SDC needs to be performed and a maximum prediction size.

402. Determine an intra-frame prediction mode.

Specifically, a prediction mode that can be used may be any one of the following modes: a direct current mode, a planar mode, and a depth modeling mode (Depth Modeling Mode, DMM), where the DMM includes an explicit wedgelet mode, an intra-predicted wedgelet partitioning mode, an inter-component prediction of wedgelet partitioning mode, and an inter-component prediction of contour partitioning mode.

403. In a case in which the size of the image block is greater than the maximum prediction size, split the image block to obtain N split image blocks according to the size of the image block and the maximum prediction size, where a size of each of the N split image blocks is the same as the maximum prediction size.

During the splitting of the image block, the image block may be split, in a recursive splitting manner, to obtain N prediction blocks. The image block is split to obtain split image blocks according to the size of the image block and the maximum prediction size. If a size of each of the split image blocks is the same as the maximum prediction size, the N split image blocks are obtained; or if the size of each of the split image blocks is greater than the maximum prediction size, the split image blocks continue to be split until the size of each of the split image blocks is the same as the maximum prediction size, and the N split image blocks are obtained.

In the foregoing step, the size of the image block is obtained from a decoding process, and the maximum prediction size is obtained from a bitstream by decoding.

Specifically, the size of the image block is compared with the maximum prediction size, and if the size of the image block is greater than the maximum prediction size, the image block is split into multiple image blocks of an equal size. Generally, the image block is split into four image blocks, where each of the split image blocks is half of the image block in width and height, or each of the split image blocks is the same as the image block in width and a quarter of the image block in height, or each of the split image blocks is the same as the image block in height and a quarter of the image block in width. Then a size of each of the multiple split image blocks is compared with the maximum prediction size, and if the size of the multiple split image blocks is greater than the maximum prediction size, the foregoing step is repeated, that is, each of the split image blocks is further split until a size of image blocks that are obtained by means of splitting is the same as the maximum prediction size, and the split image blocks whose size is the same as the maximum prediction size serve as image blocks that are used when the SDC is performed.

In addition, a prediction process of intra-frame coding is bound with a transform process of the intra-frame coding, and therefore intra-frame prediction may be performed based on a size of a transform block during the intra-frame prediction, that is, the size of the image block is consistent with the size of the transform block. Therefore, the size of the image block mentioned in the present invention may also be represented by the size of the transform block, and the maximum prediction size may also be represented by a maximum transform size. Specifically, it is supposed that log 2TrafoSize is the size of the image block, and Log 2MaxTrafoSize is the maximum prediction size, where both log 2TrafoSize and Log 2MaxTrafoSize are represented in a form of a logarithm of a block size, that is, the size of the image block equals 2 log 2TrafoSize, and the maximum prediction size equals 2 Log 2MaxTrafoSize. When 1 is subtracted from a value of log 2TrafoSize or Log 2MaxTrafoSize, it identifies that a corresponding block size is divided by 2. When log 2TrafoSize is greater than Log 2MaxTrafoSize, a current transform block is split into four transform blocks of a smaller size, where the size of each of the four transform blocks is log 2TrafoSize−1; then the foregoing splitting is performed on each of the split transform blocks according to Log 2MaxTrafoSize until it is determined that the value of log 2TrafoSize equals the value of Log 2Max-TrafoSize. In this case, the intra-frame prediction is performed based on Log 2MaxTrafoSize.

It may be understood that other manners may also be adopted to split the image block to obtain the N split image blocks, and the size of each of the N split image blocks is the same as the maximum prediction size. All these methods for splitting an image block fall within the protection scope of the present invention.

404. Determine prediction data of each of the N split image blocks by using the intra-frame prediction mode.

Specifically, a same intra-frame prediction mode is used when a pixel value in the prediction data of each of the N split image blocks is determined, for example, the direct current mode is used, or the inter-component prediction of wedgelet partitioning mode, which is a DMM, is used.

405. Repeatedly use a formula 4.1 until an average value of the prediction data of each of the N split image blocks is determined.

$$PV_i = \Sigma PPix_i[x,y]/\text{sumOfPPix}, \quad 4.1, \text{ where}$$

$PV_i$ is an average value of prediction data of the $i^{th}$ image block among the N split image blocks, $PPix_i[x,y]$ is a pixel value in prediction data whose coordinates are [x,y] in the $i^{th}$ image block, and sumOfPPix is the number of pixels in the $i^{th}$ image block.

406. Repeatedly use a formula 4.2 until an average value of raw data of each of the N split image blocks is determined.

$$BV_i = \Sigma BPix_i[x,y]/\text{sumOfBPix}, \quad 4.2, \text{ where}$$

$BV_i$ is an average value of raw data of the $i^{th}$ image block among the N split image blocks, $BPix_i[x,y]$ is a pixel value in raw data whose coordinates are [x,y] in the $i^{th}$ image block, and sumOfBPix is the number of pixels in the $i^{th}$ image block.

407. Determine a residual of each of the N split image blocks according to the average value of the prediction data of each of the N split image blocks and the average value of the raw data of each of the N split image blocks.

Specifically, a formula 4.3 is repeatedly used until the residual of each of the N split image blocks is determined.

$$S_i = PV_i - BV_i \quad 4.3, \text{ where}$$

$S_i$ is a residual of the $i^{th}$ image block among the N split image blocks, $PV_i$ is an average value of prediction data of the $i^{th}$ image block among the N split image blocks, and $BV_i$ is an average value of raw data of the $i^{th}$ image block among the N split image blocks.

408. Perform coding on each of the N split image blocks, so as to complete performing the SDC on each of the N split image blocks.

Further, a coder may further notify a decoder of the intra-frame prediction mode that is used when the SDC is performed.

It may be understood that step 403 to step 408 are performed in the case in which the size of the image block is greater than the maximum prediction size. If the size of the image block is less than or equal to the maximum prediction size, the coder may use the intra-frame prediction mode to perform the SDC on the image block.

According to the method shown in FIG. 4, in the case in which the size of the image block is greater than the maximum prediction size, a same intra-frame prediction mode can be used to perform the SDC on each of the N split image blocks. In this way, efficiency of processing, by a coder, an image block of a depth map on which the SDC coding needs to be performed can be greatly improved.

Figure 5:
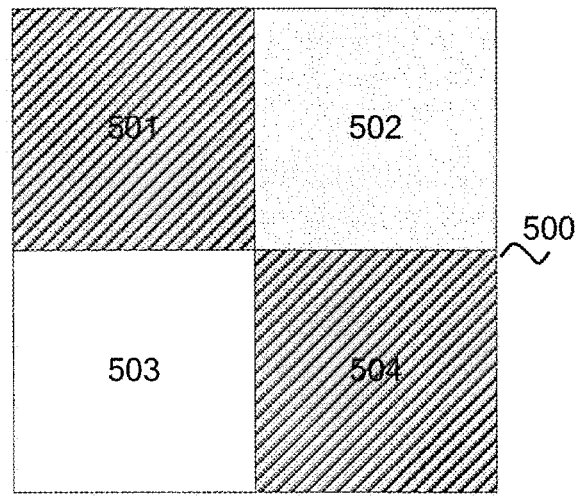
FIG. 5 is a schematic diagram of a method for coding and decoding a depth map according to an embodiment of the present invention.

FIG. 5 is a schematic diagram of a method for coding and decoding a depth map according to an embodiment of the present invention.

As shown in FIG. 5, SDC needs to be performed on an image block 500. A size of the image block 500 is 64×64 p, where p represents pixel (Pix). A maximum prediction size is 32×32 p. In this case, the image block 500 may be split into four image blocks: 501, 502, 503, and 504. According to the formula 4.1, formula 4.2, and formula 4.3, it may be calculated that average values of prediction data of 501, 502, 503, and 504 is $PV_1$, $PV_2$, $PV_3$, and $PV_4$ respectively; average values of $P_1$, $P_2$, $P_3$ and $P_4$ are $BV_1$, $BV_2$, $BV_3$, and $BV_4$ respectively; and residuals of 501, 502, 503, and 504 are $S_1$, $S_2$, $S_3$, and $S_4$ respectively. Then $S_1$, $S_2$, $S_3$, and $S_4$ are coded, so as to complete a process of performing the SDC on the image block 500.

Accordingly, when decoding is performed on the image block 500 on which the SDC coding is performed, a decoder may calculate, according to the formula 2.1 and formula 2.2, that the prediction data of 501, 502, 503, and 504 is $PV_1$, $PV_2$, $PV_3$, and $PV_4$ respectively; and reconstruction values of 501, 502, 503, and 504 are $R_1$, $R_2$, $R_3$, and $R_4$ respectively. In this way, the decoder may determine a reconstructed image block 500 according to the reconstruction values, that is, a SDC decoding process is completed.

Figure 6:
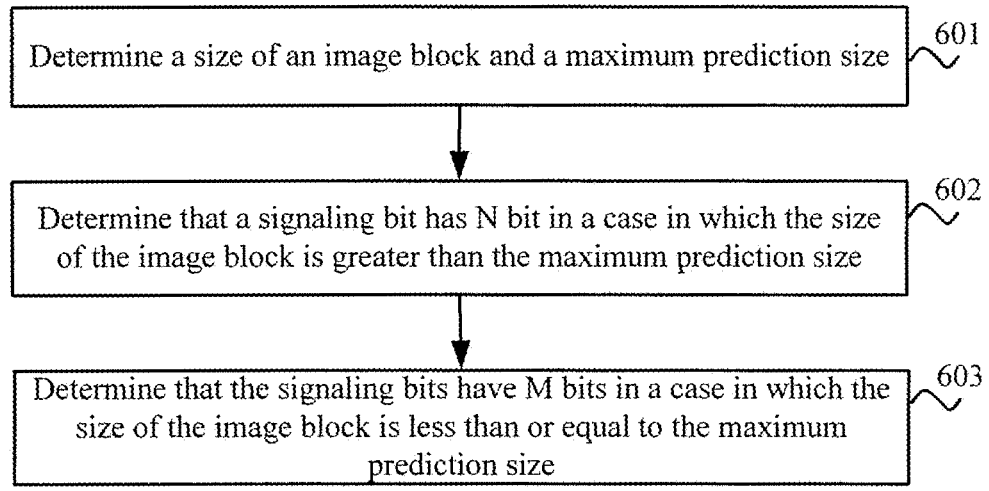
FIG. 6 is a schematic flowchart of another method for decoding a depth map according to an embodiment of the present invention.

FIG. 6 is a schematic flowchart of another method for decoding a depth map according to an embodiment of the present invention.

601. Determine a size of an image block and a maximum prediction size.

602. In a case in which the size of the image block is greater than the maximum prediction size, determine that a signaling bit has N bit, and determine, according to the signaling bit, an intra-frame prediction mode that is used when SDC is performed on the image block. For example, in a case in which a decoder determines that the signaling bit has 1 bit, if the signaling bit is 0, the decoder may determine that a direct current mode is used when the SDC is performed on the image block; if the signaling bit is 1, the decoder may determine that a planar mode is used when the SDC is performed on the image block.

603. In a case in which the size of the image block is less than or equal to the maximum prediction size, determine that signaling bits have M bits, and determine, according to the signaling bits, that a mode that is used when the SDC is performed on the image block is the direct current mode or the planar mode, where a value of M is greater than that of N, and both M and N are positive integers. For example, in the case in which the size of the image block is less than or equal to the maximum prediction size, it is determined that 2 bits are used as signaling bits that identify a selected mode. For example, if the signaling bits are 00, the decoder may determine that the intra-frame prediction mode that is used when the SDC is performed on the image block is the direct current mode. If the signaling bits are 10, the decoder may determine that the intra-frame prediction mode that is used when the SDC is performed on the image block is the planar mode. If the signaling bits are 11, the decoder may determine that the intra-frame prediction mode that is used when the SDC is performed on the image block is an explicit identifier-based wedgelet mode, which is a DMM.

It may be understood that the intra-frame prediction mode may be the planar mode or the direct current mode or the DMM.

In the foregoing example, if there are only two candidate modes, such as the planar mode and the explicit identifier-based wedgelet mode, in the case in which the size of the image block is greater than the maximum prediction size, a value of N in the N bits is 0, that is, the decoder may determine, without a need of an identifier, the intra-frame prediction mode that is used in the SDC, such as the planar mode. In the case in which the size of the image block is less than or equal to the maximum prediction size, a value of M in the M bits is 1; the intra-frame prediction mode that is used in the SDC is determined according to the value of M, for example, 0 indicates that the explicit identifier-based wedgelet mode is used, and 1 indicates that the planar mode is used.

In arithmetic coding (Arithmetic Coding), all syntax elements are coded in a form of a binary symbol, for example, in the foregoing example, in the case in which the size of the image block is less than or equal to the maximum prediction size, "the signaling bits being 10" indicates the planar mode, and in this case, the signaling bits "10" are a binary symbol of the arithmetic coding.

Apparently, another embodiment of the present invention may further provide a method for decoding a depth map, where the method includes:

determining a size of an image block and a maximum prediction size;

in a case in which the size of the image block is greater than the maximum prediction size, determining an intra-frame prediction mode that is used when the SDC is performed on the image block; and in a case in which the size of the image block is less than or equal to the maximum prediction size, determining that signaling bits have M bits, and determining, according to the signaling bits, an intra-frame prediction mode that is used when the SDC is performed on the image block.

Optionally, the intra-frame prediction mode is a direct current mode or a planar mode or a depth modeling mode DMM.

A person skilled in the art may clearly learn from the foregoing implementation manner that in the case in which the size of the image block is greater than the maximum prediction size, the implementation manner of determining that the signaling bit has N bit and determining, according to the signaling bit, the intra-frame prediction mode that is used when the SDC is performed on the image block is not mandatory, and in the case in which the size of the image block is greater than the maximum prediction size, the intra-frame prediction mode that is used when the SDC is performed on the image block may be directly determined. The scope described in this embodiment of the present invention is still included in the protection scope of the specific implementation manner shown in FIG. 6.

Accordingly, another embodiment of the present invention may further provide an apparatus for decoding a depth map, where the decoding apparatus includes:

a determining unit, configured to determine a size of an image block and a maximum prediction size; and a decoding unit, configured to, in a case in which the size of the image block is greater than the maximum prediction size, determine an intra-frame prediction mode that is used when the SDC is performed on the image block; and in a case in which the size of the image block is less than or equal to the maximum prediction size, determine that signaling bits have M bits, and determine, according to the signaling bits, an intra-frame prediction mode that is used when the SDC is performed on the image block.

Optionally, the intra-frame prediction mode is a direct current mode or a planar mode or a depth modeling mode DMM.

According to the method shown in FIG. 6, when a decoder performs SDC decoding, the number of bits of signaling bits that are used to identify an intra-frame prediction mode can be reduced, thereby achieving objectives of reducing resources and accelerating decoding.

Figure 7:
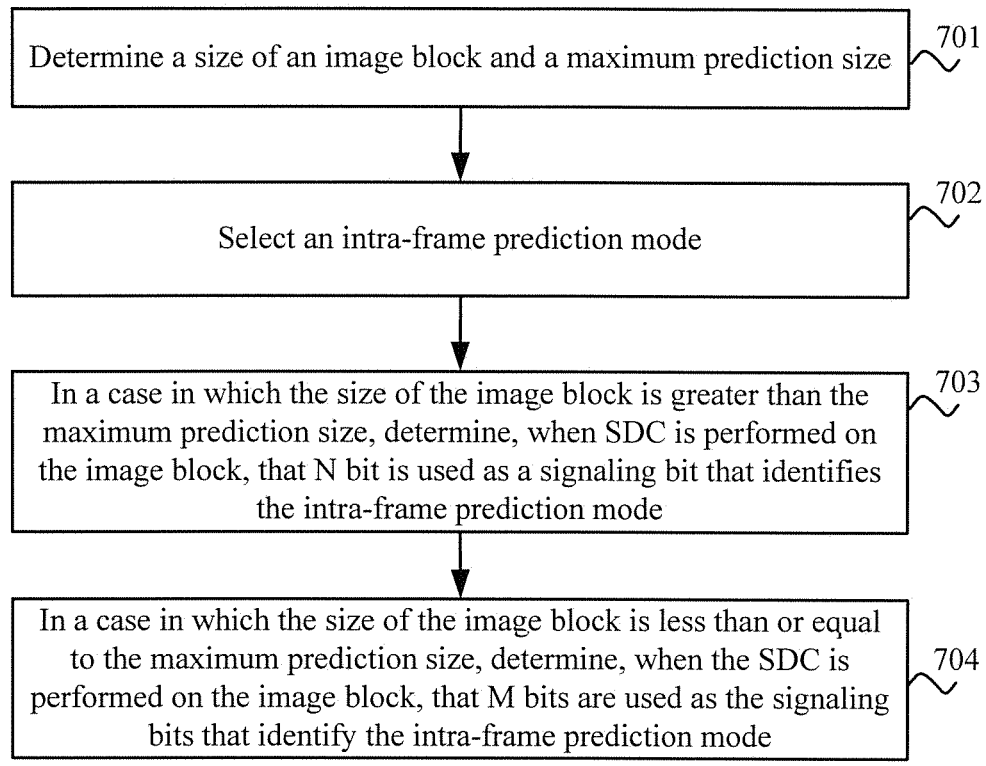
FIG. 7 is a schematic flowchart of another method for coding a depth map according to an embodiment of the present invention.

FIG. 7 is a schematic flowchart of another method for coding a depth map according to an embodiment of the present invention.

701. Determine a size of an image block and a maximum prediction size.

702. Select an intra-frame prediction mode.

Specifically, the intra-frame prediction mode may be a direct current mode or a planar mode or a DMM.

703. In a case in which the size of the image block is greater than the maximum prediction size, determine, when SDC is performed on the image block, that N bit is used as a signaling bit that identifies the intra-frame prediction mode.

Specifically, the signaling bit being 0 indicates that the intra-frame prediction mode that is used when the SDC is performed on the image block is the direct current mode. The signaling bit being 1 indicates that the intra-frame prediction mode that is used when the SDC is performed on the image block is the planar mode.

704. In a case in which the size of the image block is less than or equal to the maximum prediction size, determine, when the SDC is performed on the image block, that M bits are used as signaling bits that identify the intra-frame prediction mode, where a value of M is greater than that of N, and both M and N are positive integers.

Specifically, it is determined that 2 bits are used as the signaling bits that identify the selected mode. For example, the signaling bits being 00 indicates that the intra-frame prediction mode that is used when the SDC is performed on the image block is the direct current mode. The signaling bits being 10 indicates that the intra-frame prediction mode that is used when the SDC is performed on the image block is the planar mode. The signaling bits being 11 indicates that the intra-frame prediction mode that is used when the SDC is performed on the image block is the explicit identifier-based wedgelet mode, which is a DMM.

Optionally, as another embodiment, in a case in which it is determined that the size of the image block is greater than the maximum prediction size of intra-frame prediction, a coder does not use the SDC mode to perform coding on the image block of the depth map. Accordingly, a decoder does not use the SDC mode to perform decoding on the image block of the depth map either.

According to the method shown in FIG. 7, when a coder performs SDC coding, the number of bits of signaling bits that are used to identify an intra-frame prediction mode can be reduced, thereby achieving an objective of reducing resources.

Figure 8:
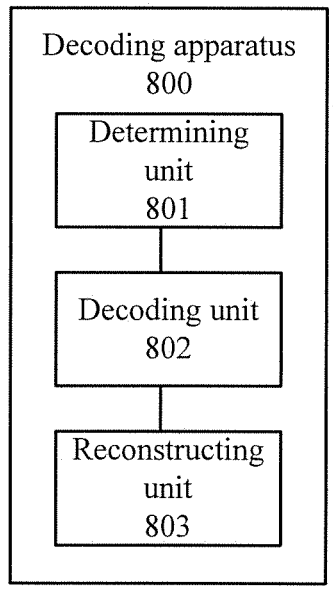
FIG. 8 is a structural block diagram of an apparatus for decoding a depth map according to an embodiment of the present invention.

FIG. 8 is a structural block diagram of an apparatus for decoding a depth map according to an embodiment of the present invention. The decoding apparatus 800 shown in FIG. 8 may perform each step shown in FIG. 1 or FIG. 2, and the decoding apparatus 800 includes a determining unit 801, a decoding unit 802, and a reconstructing unit 803.

The determining unit 801 is configured to determine, according to a flag of SDC, to perform SDC decoding.

The determining unit 801 is further configured to determine a size of an image block and a maximum prediction size.

The determining unit 801 is further configured to determine an intra-frame prediction mode that is used when SDC is performed on the image block.

The determining unit 801 is further configured to split the image block to obtain N split image blocks according to the size of the image block and the maximum prediction size when the size of the image block is greater than the maximum prediction size, where a size of each of the N split image blocks is the same as the maximum prediction size.

The decoding unit 802 is configured to perform the SDC decoding on each of the N split image blocks by using the intra-frame prediction mode.

The reconstructing unit 803 is configured to reconstruct the image block according to a result of the decoding performed on each of the N image blocks.

As shown in FIG. 8, when the decoding apparatus 800 decodes an image block on which SDC is performed, a same intra-frame prediction mode can be adopted to decode N image blocks that belong to the image block. In this way, processing efficiency of reconstructing, by the decoding apparatus 800, an image block of a depth map on which SDC coding is performed can be improved.

Specifically, the determining unit 801 is specifically configured to split the image block to obtain split image blocks according to the size of the image block and the maximum prediction size, where if a size of each of the split image blocks is the same as the maximum prediction size, the N split image blocks are obtained; or if the size of each of the split image blocks is greater than the maximum prediction size, continue to split the split image blocks until the size of each of the split image blocks is the same as the maximum prediction size, and the N split image blocks are obtained.

Specifically, the decoding unit 802 is specifically configured to obtain N residuals by means of decoding when performing the SDC decoding on each of the N split image blocks.

Specifically, the decoding unit 802 is specifically configured to determine an average value of prediction data of each of the N image blocks and determine a residual of each of the N image blocks by using the intra-frame prediction mode that is used when the SDC is performed on the image block; and determine a reconstruction value of each of the N image blocks according to the average value of the prediction data of each of the N image blocks and the residual of each of the N image blocks, so as to complete performing the decoding on performed on each of the N image blocks.

Specifically, the decoding unit 802 is specifically configured to determine the prediction data of each of the N image blocks by using the intra-frame prediction mode that is used when the SDC is performed on the image block; and determine the average value of the prediction data of each of the N image blocks by using the following formula:

$PV_i = \Sigma PPix_i[x,y]/\text{sumOfPPix}$, where $PV_i$ is an average value of prediction data of the $i^{th}$ image block among the N image blocks, $PPix_i[x,y]$ is a pixel value in prediction data whose coordinates are [x,y] in the $i^{th}$ image block, and sumOfPPix is the number of pixels in the $i^{th}$ image block.

Specifically, the decoding unit 802 is specifically configured to determine the reconstruction value of each of the N image blocks by using the following formula:

$R_i = PV_i + S_i$, where $R_i$ is a reconstruction value of the $i^{th}$ image block among the N image blocks, $PV_i$ is an average value of prediction data of the $i^{th}$ image block among the N image blocks, and $S_i$ is a residual of the $i^{th}$ image block among the N image blocks.

Figure 9:
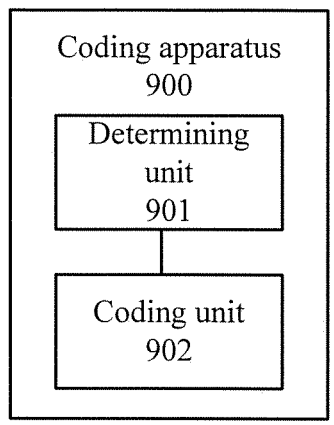
FIG. 9 is a structural block diagram of an apparatus for coding a depth map according to an embodiment of the present invention.

FIG. 9 is a structural block diagram of an apparatus for coding a depth map according to an embodiment of the present invention. The coding apparatus 900 shown in FIG. 9 may perform each step in FIG. 3 or FIG. 4, and the coding apparatus 900 includes a determining unit 901 and a coding unit 902.

The determining unit 901 is configured to determine a size of an image block and a maximum prediction size.

The determining unit 901 is further configured to determine an intra-frame prediction mode.

The determining unit 901 is further configured to split the image block to obtain N split image blocks according to the size of the image block and the maximum prediction size when the size of the image block is greater than the maximum prediction size, where a size of each of the N split image blocks is the same as the maximum prediction size.

The coding unit 902 is configured to perform SDC on each of the N split image blocks by using the intra-frame prediction mode.

As shown in FIG. 9, in a case in which the size of the image block is greater than the maximum prediction size, the coding apparatus 900 may perform the SDC on each of the N split image blocks by using a same intra-frame prediction mode. In this way, efficiency of processing, by the coding apparatus 900, an image block of a depth map on which the SDC coding needs to be performed can be greatly improved.

Optionally, the determining unit 901 is specifically configured to split, in a recursive splitting manner, the image block to obtain the N split image blocks according to the size of the image block and the maximum prediction size.

Specifically, the coding unit 902 is specifically configured to determine an average value of prediction data of each of the N split image blocks and determine an average value of raw data of each of the N split image blocks by using the intra-frame prediction mode; determine a residual of each of the N split image blocks according to the average value of the prediction data of each of the N split image blocks and the average value of the raw data of each of the N split image blocks; and code the residual of each of the N split image blocks, so as to complete performing simplified depth coding SDC on each of the N split image blocks.

Specifically, the coding unit 902 is specifically configured to determine a pixel value in the prediction data of each of the N split image blocks by using the intra-frame prediction mode; and determine the average value of the prediction data of each of the N split image blocks by using the following formula:

$PV_i = \Sigma PPix_i[x,y]/\text{sumOfPPix}$, where $PV_i$ is an average value of prediction data of the $i^{th}$ image block among the N split image blocks, $PPix_i[x,y]$ is a pixel value in prediction data whose coordinates are [x,y] in the $i^{th}$ image block, and sumOfPPix is the number of pixels in the $i^{th}$ image block.

Specifically, the coding unit 902 is specifically configured to determine the average value of the raw data of each of the N split image blocks by using the following formula:

$BV_i = \Sigma BPix_i[x,y]/\text{sumOfBPix}$, where $BV_i$ is an average value of raw data of the $i^{th}$ image block among the N split image blocks, $BPix_i[x,y]$ is a pixel value in raw data whose coordinates are [x,y] in the $i^{th}$ image block, and sumOfBPix is the number of pixels in the $i^{th}$ image block.

Specifically, the coding unit is specifically configured to determine the residual of each of the N split image blocks by using the following formula:

$$S_i = PV_i - BV_i, \text{ where}$$

$S_i$ is a residual of the $i^{th}$ image block among the N split image blocks, $PV_i$ is an average value of prediction data of the $i^{th}$ image block among the N image blocks, and $BV_i$ is an average value of raw data of the $i^{th}$ image block among the N image blocks.

Optionally, the determining unit 901 is further configured to determine the intra-frame prediction mode when the size of the image block is less than or equal to the maximum prediction size. The coding unit 902 is further configured to perform the SDC on the image block according to the intra-frame prediction mode.

Figure 10:
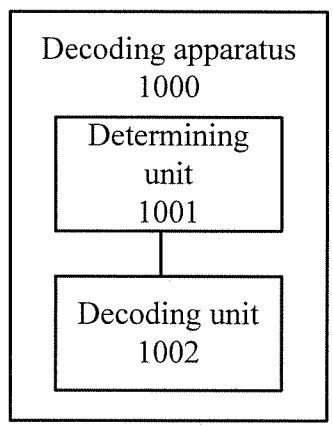
FIG. 10 is a structural block diagram of another apparatus for decoding a depth map according to an embodiment of the present invention.

FIG. 10 is a structural block diagram of another apparatus for decoding a depth map according to an embodiment of the present invention. As shown in FIG. 10, the decoding apparatus 1000 includes a determining unit 1001 and a decoding unit 1002.

The determining unit 1001 is configured to determine a size of an image block and a maximum prediction size.

The decoding unit 1002 is configured to, in a case in which the size of the image block is greater than the maximum prediction size, determine that a signaling bit has N bit, and determine, according to the signaling bit, an intra-frame prediction mode that is used when SDC is performed on the image block.

The decoding unit 1002 is further configured to, in a case in which the size of the image block is less than or equal to the maximum prediction size, determine that the signaling bits have M bits, and determine, according to the signaling bits, that a mode that is used when the SDC is performed on the image block is a direct current mode or a planar mode, where a value of M is greater than or equal to N, and both M and N are positive integers.

As shown in FIG. 10, when the decoding apparatus 1000 performs SDC decoding, the number of bits of signaling bits that are used to identify an intra-frame prediction mode can be reduced, thereby achieving objectives of reducing resources and accelerating decoding.

Figure 11:
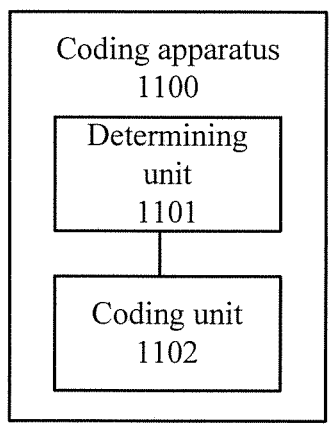
FIG. 11 is a structural block diagram of another apparatus for coding a depth map according to an embodiment of the present invention.

FIG. 11 is a structural block diagram of another apparatus for coding a depth map according to an embodiment of the present invention. As shown in FIG. 11, the coding apparatus 1100 includes a determining unit 1101 and a coding unit 1102.

The determining unit 1101 is configured to determine a size of an image block and a maximum prediction size.

The coding unit 1102 is configured to select an intra-frame prediction mode.

The coding unit 1102 is further configured to, in a case in which the size of the image block is greater than the maximum prediction size, determine, when SDC is performed on the image block, that N bit is used as a signaling bit that identifies the intra-frame prediction mode.

The coding unit 1102 is further configured to, in a case in which the size of the image block is less than or equal to the maximum prediction size, determine, when the SDC is performed on the image block, that M bits are used as signaling bits that identify the intra-frame prediction mode.

As shown in FIG. 11, when the coding apparatus 1100 performs SDC coding, the number of bits of signaling bits that are used to identify an intra-frame prediction mode can be reduced, thereby achieving an objective of reducing resources.

Figure 12:
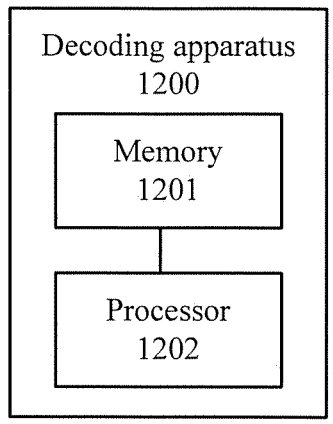
FIG. 12 is a structural block diagram of an apparatus for decoding a depth map according to an embodiment of the present invention.

FIG. 12 is a structural block diagram of an apparatus for decoding a depth map according to an embodiment of the present invention. The decoding apparatus 1200 may perform each step of the decoding method in FIG. 1 or FIG. 2. The decoding apparatus 1200 shown in FIG. 12 may perform each step in FIG. 1 or FIG. 2, and the decoding apparatus 1200 includes a memory 1201 and a processor 1202.

The memory 1201 is configured to store a decoding algorithm of a depth map so that the processor 1202 performs SDC decoding on the depth map according to the decoding algorithm.

The processor 1202 is configured to determine, according to a flag of SDC, to perform the SDC decoding.

The processor 1202 is further configured to determine a size of an image block and a maximum prediction size.

The processor 1202 is further configured to determine an intra-frame prediction mode that is used when SDC is performed on the image block.

The processor 1202 is further configured to split the image block to obtain N split image blocks according to the size of the image block and the maximum prediction size in a case in which the size of the image block is greater than the maximum prediction size, where a size of each of the N split image blocks is the same as the maximum prediction size.

The processor 1202 is further configured to perform the SDC decoding on each of the N split image blocks by using the intra-frame prediction mode.

The processor 1202 is configured to reconstruct the image block according to a result of the decoding performed on each of the N image blocks.

As shown in FIG. 12, when the decoding apparatus 1200 performs decoding on an image block on which SDC is performed, a same intra-frame prediction mode can be adopted to decode N image blocks that belong to the image block. In this way, processing efficiency of reconstructing, by the decoding apparatus 1200, an image block of a depth map on which SDC coding is performed can be improved.

Specifically, the processor 1202 is specifically configured to split the image block to obtain split image blocks according to the size of the image block and the maximum prediction size, where if a size of each of the split image blocks is the same as the maximum prediction size, the N split image blocks are obtained; or if the size of each of the split image blocks is greater than the maximum prediction size, continue to split the split image blocks until the size of each of the split image blocks is the same as the maximum prediction size, and the N split image blocks are obtained.

Specifically, the processor 1202 is specifically configured to determine an average value of prediction data of each of the N image blocks and determine a residual of each of the N image blocks by using the intra-frame prediction mode that is used when the SDC is performed on the image block; and determine a reconstruction value of each of the N image blocks according to the average value of the prediction data of each of the N image blocks and the residual of each of the N image blocks, so as to complete performing the decoding on performed on each of the N image blocks.

Specifically, the processor 1202 is specifically configured to determine the prediction data of each of the N image blocks by using the intra-frame prediction mode that is used when the SDC is performed on the image block; and determine the average value of the prediction data of each of the N image blocks by using the following formula:

$$PV_i = \Sigma PPix_i[x,y]/\text{sumOfPPix}, \text{ where}$$

$PV_i$ is an average value of prediction data of the $i^{th}$ image block among the N image blocks, $PPix_i[x,y]$ is a pixel value in prediction data whose coordinates are [x,y] in the $i^{th}$ image block, and sumOfPPix is the number of pixels in the $i^{th}$ image block.

Specifically, the processor 1202 is specifically configured to determine the reconstruction value of each of the N image blocks by using the following formula:

$$R_i=PV_i+S_i, \text{ where}$$

$R_i$ is a reconstruction value of the $i^{th}$ image block among the N image blocks, $PV_i$ is an average value of prediction data of the $i^{th}$ image block among the N image blocks, and $S_i$ is a residual of the $i^{th}$ image block among the N image blocks.

Figure 13:
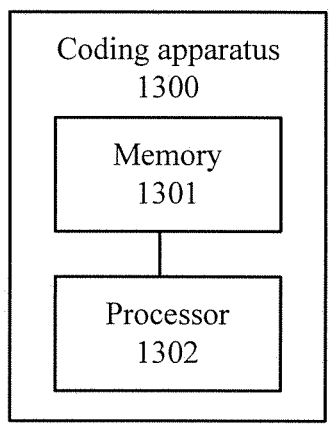
FIG. 13 is a structural block diagram of an apparatus for coding a depth map according to an embodiment of the present invention.

FIG. 13 is a structural block diagram of an apparatus for coding a depth map according to an embodiment of the present invention. The coding apparatus 1300 may perform each step of the coding method in FIG. 3 or FIG. 4. The coding apparatus 1300 shown in FIG. 13 may perform each step in FIG. 3 or FIG. 4, and the coding apparatus 1300 includes a memory 1301 and a processor 1302.

The memory 1301 is configured to store a coding algorithm of a depth map so that the processor performs SDC according to the algorithm.

The processor 1302 is configured to determine a size of an image block and a maximum prediction size.

The processor 1302 is further configured to determine an intra-frame prediction mode.

The processor 1302 is further configured to split the image block to obtain N split image blocks according to the size of the image block and the maximum prediction size when the size of the image block is greater than the maximum prediction size, where a size of each of the N split image blocks is the same as the maximum prediction size.

The processor 1302 is configured to perform the SDC on each of the N split image blocks by using the intra-frame prediction mode.

As shown in FIG. 13, in a case in which the size of the image block is greater than the maximum prediction size, the coding apparatus 1300 may perform the SDC on each of the N split image blocks by using a same intra-frame prediction mode. In this way, efficiency of processing, by the coding apparatus 1300, an image block of a depth map on which the SDC coding needs to be performed can be greatly improved.

Optionally, the processor 1302 is specifically configured to split, in a recursive splitting manner, the image block to obtain the N split image blocks according to the size of the image block and the maximum prediction size.

Specifically, the processor 1302 is specifically configured to determine an average value of prediction data of each of the N split image blocks and determine an average value of raw data of each of the N split image blocks by using the intra-frame prediction mode; determine a residual of each of the N split image blocks according to the average value of the prediction data of each of the N split image blocks and the average value of the raw data of each of the N split image blocks; and code the residual of each of the N split image blocks, so as to complete performing simplified depth coding SDC on each of the N split image blocks.

Specifically, the processor 1302 is specifically configured to determine a pixel value in the prediction data of each of the N split image blocks by using the intra-frame prediction mode; and determine the average value of the prediction data of each of the N split image blocks by using the following formula:

$$PV_i = \Sigma PPix_i[x,y]/\text{sumOfPPix}, \text{ where}$$

$PV_i$ is an average value of prediction data of the $i^{th}$ image block among the N split image blocks, $PPix_i[x,y]$ is a pixel value in prediction data whose coordinates are [x,y] in the $i^{th}$ image block, and sumOfPPix is the number of pixels in the $i^{th}$ image block.

Specifically, the processor 1302 is specifically configured to determine the average value of the raw data of each of the N split image blocks by using the following formula:

$$BV_i = \Sigma BPix_i[x,y]/\text{sumOfBPix}, \text{ where}$$

$BV_i$ is an average value of raw data of the $i^{th}$ image block among the N split image blocks, $BPix_i[x,y]$ is a pixel value in raw data whose coordinates are [x,y] in the $i^{th}$ image block, and sumOfBPix is the number of pixels in the $i^{th}$ image block.

Specifically, the coding unit is specifically configured to determine the residual of each of the N split image blocks by using the following formula:

$$S_i = PV_i - BV_i, \text{ where}$$

$S_i$ is a residual of the $i^{th}$ image block among the N split image blocks, $PV_i$ is an average value of prediction data of the $i^{th}$ image block among the N image blocks, and $BV_i$ is an average value of raw data of the $i^{th}$ image block among the N image blocks.

Optionally, the processor 1302 is further configured to determine the intra-frame prediction mode when the size of the image block is less than or equal to the maximum prediction size. The processor 1302 is further configured to perform the SDC on the image block according to the intra-frame prediction mode.

Figure 14:
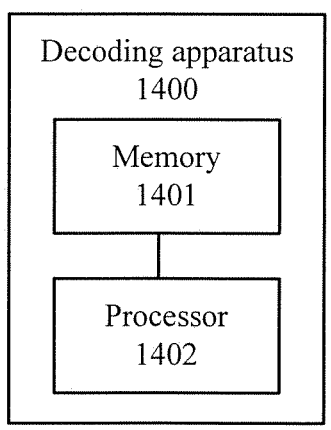
FIG. 14 is a structural block diagram of another apparatus for decoding a depth map according to an embodiment of the present invention.

FIG. 14 is a structural block diagram of another apparatus for decoding a depth map according to an embodiment of the present invention. The decoding apparatus 1400 may perform each step of the decoding method in FIG. 6. As shown in FIG. 14, the decoding apparatus 1400 includes a memory 1401 and a processor 1402.

The memory 1401 is configured to store a decoding algorithm of a depth map so that the processor 1402 performs SDC decoding on the depth map according to the decoding algorithm.

The processor 1402 is configured to determine a size of an image block and a maximum prediction size.

The processor 1402 is further configured to, in a case in which the size of the image block is greater than the maximum prediction size, determine that a signaling bit has N bit, and determine, according to the signaling bit, an intra-frame prediction mode that is used when SDC is performed on the image block.

The processor 1402 is further configured to, in a case in which the size of the image block is less than or equal to the maximum prediction size, determine that the signaling bits have M bits, and determine, according to the signaling bits, that a mode that is used when the SDC is performed on the image block is a direct current mode or a planar mode, where a value of M is greater than or equal to N, and both M and N are positive integers.

As shown in FIG. 14, when the decoding apparatus 1400 performs SDC decoding, the number of bits of signaling bits that are used to identify an intra-frame prediction mode can be reduced, thereby achieving objectives of reducing resources and accelerating decoding.

Figure 15:
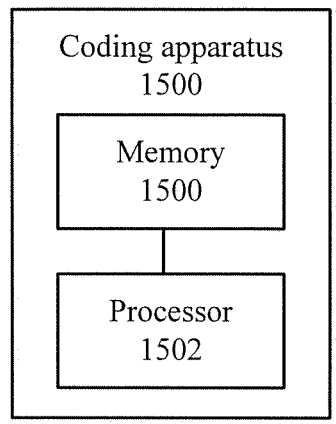
FIG. 15 is a structural block diagram of another apparatus for coding a depth map according to an embodiment of the present invention.

FIG. 15 is a structural block diagram of another apparatus for coding a depth map according to an embodiment of the present invention. The coding apparatus 1500 may perform each step of the coding method in FIG. 7. As shown in FIG. 15, the coding apparatus 1500 includes a memory 1501 and a processor 1502.

The memory 1501 is configured to store a coding algorithm of a depth map so that the processor 1502 performs SDC on the depth map according to the coding algorithm.

The processor 1502 is configured to determine a size of an image block and a maximum prediction size.

The processor 1502 is further configured to determine an intra-frame prediction mode.

The processor 1502 is further configured to, in a case in which the size of the image block is greater than the maximum prediction size, determine, when SDC is performed on the image block, that N bit is used as a signaling bit that identifies the intra-frame prediction mode.

The coding unit 1502 is further configured to, in a case in which the size of the image block is less than or equal to the maximum prediction size, determine, when the SDC is performed on the image block, that M bits are used as signaling bits that identify the intra-frame prediction mode.

As shown in FIG. 15, when the coding apparatus 1500 performs SDC coding, the number of bits of signaling bits that are used to identify an intra-frame prediction mode can be reduced, thereby achieving an objective of reducing resources.

Figure 16:
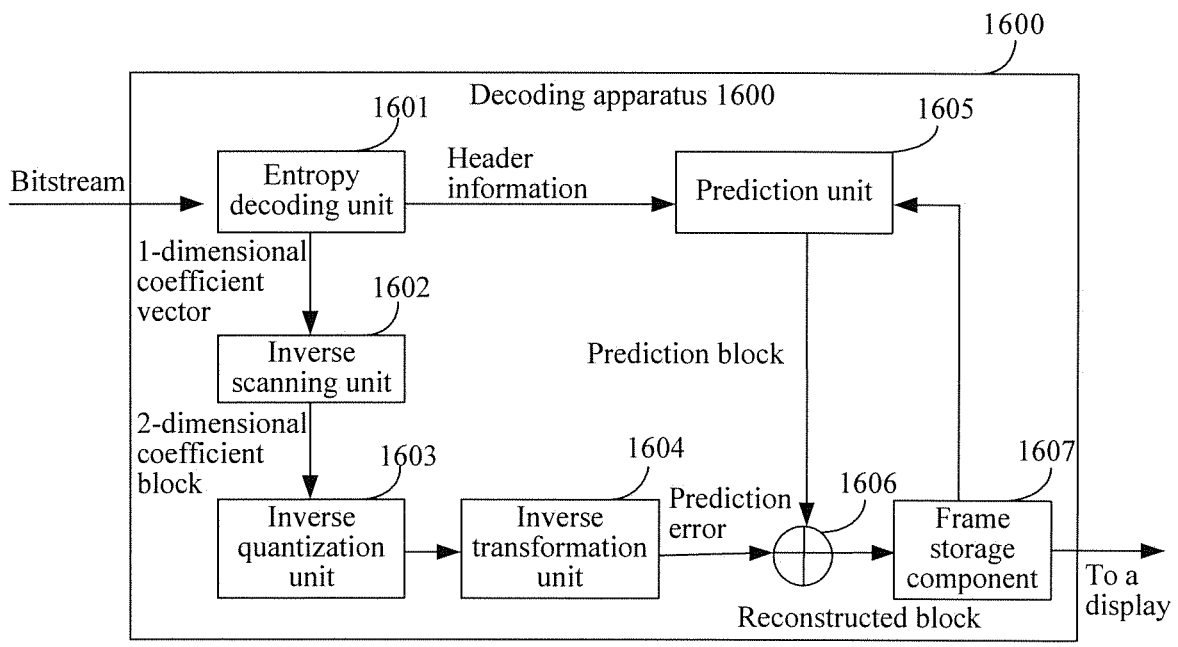
FIG. 16 is a structural block diagram of a decoding apparatus according to an embodiment of the present invention.

FIG. 16 is a structural block diagram of a decoding apparatus according to an embodiment of the present invention. The decoding apparatus 1600 may perform each step of the decoding method in FIG. 1 or FIG. 2. The decoding apparatus 1600 includes an entropy decoding unit 1601, an inverse scanning unit 1602, a dequantization unit 1603, an inverse transformation unit 1604, a prediction unit 1605, a combination unit 1606, and a frame storage component 1607.

The decoding apparatus 1600 may be located in a handheld terminal device such as a mobile phone and a tablet computer, and a wearable terminal device with a video playing function, and may also be located in an apparatus such as a notebook computer, a desktop computer, and a media processing function node on a communications network.

When a bitstream generated by a coder passes through the entropy decoding unit 1601, the entropy decoding unit 1601 performs entropy decoding processing on the bitstream and obtains a group of reconstruction values of prediction errors and header information (including motion information), where the group of the reconstruction values of the prediction errors may be considered as a 1-dimensional coefficient vector; then the 1-dimensional coefficient vector passes through the inverse scanning unit 1602, and the inverse scanning 1602 performs inverse scanning processing to obtain a 2-dimensional coefficient block; the 2-dimensional coefficient block undergoes dequantization processing of the dequantization unit 1603 and inverse transformation processing of the inverse transformation unit 1604, and a prediction error of a target area is obtained; and the header information undergoes processing of the prediction unit 1605, and final prediction value of the target area is obtained.

For the foregoing processing process, refer to the method for decoding a depth map provided in the embodiments of the present invention. The combination unit 1606 combines the prediction error and the final prediction value to obtain a reconstructed block, and the reconstructed block is stored by the frame storage component 1607, may be displayed on a display of an apparatus such as the mobile phone and the notebook computer during video playing, and may also assist in determining of the final prediction value when the prediction unit 1605 subsequently processes the header information.

Specially, in this embodiment of the present invention, the functions of the decoding unit 802 in FIG. 8 may be implemented by the entropy decoding unit 1601 of the decoding apparatus 1600, and all the functions of the determining unit 801 may be implemented by the prediction unit 1605 of the decoding apparatus 1600.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for simplified depth decoding, the method comprising:
   obtaining a flag of simplified depth coding (SDC), wherein a value of the flag indicates that SDC decoding is used for an image block;
   determining a size of the image block and a maximum prediction size, wherein the image block is a transform block, wherein the size of the image block is a size of the transform block, and wherein the maximum prediction size is a maximum transform size;
   determining an intra prediction mode of the image block;
   comparing the size of the image block with the maximum prediction size;
   splitting the image block to obtain N split image blocks when the size of the image block is greater than the maximum prediction size, wherein a size of each of the N split image blocks is the same as the maximum prediction size and the N split image blocks are all transform blocks;
   obtaining a residual by means of decoding when performing the SDC decoding on an $i^{th}$ split image block of the N split image blocks;
   obtaining prediction data of the $i^{th}$ split image block using the intra prediction mode that is used when the SDC is performed on the image block;
   determining an average value of the prediction data of the $i^{th}$ split image block based on a plurality of pixel values in the prediction data of the $i^{th}$ split image block and a number of pixels in the $i^{th}$ split image block; and
   determining a reconstruction value of the $i^{th}$ split image block according to the average value of the prediction data of the $i^{th}$ split image block and the residual, so as to complete performing the SDC decoding on the $i^{th}$ split image block.

2. The method according to claim 1, wherein the intra prediction mode used when the SDC is performed on the image block is a depth modeling mode (DMM) or a planar mode or a direct current mode.

3. The method according to claim 1, wherein splitting the image block to obtain the N split image blocks comprises:
   splitting the image block to obtain split image blocks according to the size of the image block and the maximum prediction size, wherein when a size of the split image blocks is the same as the maximum prediction size, the N split image blocks are obtained, and wherein when a size of the split image blocks is greater than the maximum prediction size, the split image blocks are further split until the size of the split image blocks is the same as the maximum prediction size, and the N split image blocks are obtained.

4. The method according to claim 1, wherein determining the average value of the prediction data of the $i^{th}$ split image block based on the plurality of pixel values in the prediction data of the $i^{th}$ split image block and the number of pixels in the $i^{th}$ split image block comprises determining the average value of the prediction data of the $i^{th}$ split image block of the N split image blocks by using the following formula:

$$PV_i = \Sigma PPix_i[x,y]/\text{sumOfPPix},$$

wherein $PV_i$ is an average value of prediction data of the $i^{th}$ split image block among the N split image blocks, $PPix_i[x,y]$ is a pixel value in prediction data whose coordinates are $[x,y]$ in the $i^{th}$ split image block, and sumOfPPix is the number of pixels in the $i^{th}$ split image block.

5. The method according to claim 1, wherein determining the reconstruction value of the $i^{th}$ split image block according to the average value of the prediction data of the $i^{th}$ split image block and the residual, so as to complete performing the SDC decoding on the $i^{th}$ split image block comprises determining the reconstruction value of the $i^{th}$ split image block of the N split image blocks by using the following formula:

$$R_i = PV_i + S_i,$$

wherein $R_i$ is a reconstruction value of the $i^{th}$ split image block among the N split image blocks, $PV_i$ is an average value of prediction data of the $i^{th}$ split image block among the N split image blocks, and $S_i$ is a residual of the $i^{th}$ split image block among the N split image blocks.

6. A method for simplified depth coding (SDC), the method comprising:
   determining a size of an image block and a maximum prediction size, wherein the image block is a transform block, wherein the size of the image block is a size of the transform block, and wherein the maximum prediction size is a maximum transform size;
   determining an intra prediction mode;
   comparing the size of the image block with the maximum prediction size;
   splitting the image block to obtain N split image blocks when the size of the image block is greater than the maximum prediction size, wherein a size of the N split image blocks is the same as the maximum prediction size, and wherein the N split image blocks are all transform blocks; and
   determining prediction data of the $i^{th}$ split image block of the N split image blocks by using the intra prediction mode;
   determining an average value of the prediction data of the $i^{th}$ split image block based on a plurality of pixel values in the prediction data of the $i^{th}$ split image block and a number of pixels in the $i^{th}$ split image block;
   determining an average value of raw data of the $i^{th}$ split image block of the N split image blocks;
   determining a residual of the $i^{th}$ split image block according to the average value of the prediction data of the $i^{th}$ split image block and the average value of the raw data of the $i^{th}$ split image block; and
   coding the residual of the $i^{th}$ split image block, so as to complete performing SDC on the $i^{th}$ split image block.

7. The method according to claim 6, wherein the intra prediction mode is a depth modeling mode (DMM) or a planar mode or a direct current mode.

8. The method according to claim 6, wherein splitting the image block to obtain N split image blocks comprises splitting the image block to obtain split image blocks according to the size of the image block and the maximum prediction size, wherein when a size of the split image blocks is the same as the maximum prediction size, the N split image blocks are obtained, and when a size of the split image blocks is greater than the maximum prediction size, the method comprises continuing to split the split image blocks until the size of the split image blocks is the same as the maximum prediction size, and the N split image blocks are obtained.

9. The method according to claim 6, wherein determining the average value of the prediction data of the $i^{th}$ split image block based on the plurality of pixel values in the prediction data of the $i^{th}$ split image block and the number of pixels in the $i^{th}$ split image block, comprises determining the average value of the prediction data of the $i^{th}$ split image block of the N split image blocks by using the following formula:

$$PV_i = \Sigma PPix_i[x,y]/\text{sumOfPPix},$$

wherein $PV_i$ is an average value of prediction data of the $i^{th}$ split image block among the N split image blocks, $PPix_i[x,y]$ is a pixel value in prediction data whose coordinates are [x,y] in the $i^{th}$ split image block, and sumOfPPix is the number of pixels in the $i^{th}$ split image block.

10. The method according to claim 6, wherein determining the average value of raw data of the $i^{th}$ split image block of the N split image blocks comprises determining the average value of the raw data of the $i^{th}$ split image block of the N split image blocks by using the following formula:

$$BV_i = \Sigma BPix_i[x,y]/\text{sumOfBPix},$$

wherein $BV_i$ is an average value of raw data of the $i^{th}$ split image block among the N split image blocks, $BPix_i[x,y]$ is a pixel value in raw data whose coordinates are [x,y] in the $i^{th}$ split image block, and sumOfBPix is the number of pixels in the $i^{th}$ split image block.

11. The method according to claim 6, wherein determining the residual of the $i^{th}$ split image block according to the average value of the prediction data of the $i^{th}$ split image block and the average value of the raw data of the $i^{th}$ split image block comprises determining the residual of the $i^{th}$ split image block of the N split image blocks by using the following formula:

$$S_i = PV_i - BV_i,$$

wherein $S_i$ is a residual of the $i^{th}$ split image block among the N split image blocks, $PV_i$ is an average value of prediction data of the $i^{th}$ split image block among the N split image blocks, and $BV_i$ is an average value of raw data of the $i^{th}$ split image block among the N split image blocks.

12. The method according to claim 6, wherein the method further comprises performing SDC on the image block by using the intra prediction mode when the size of the image block is less than or equal to the maximum prediction size.

13. A method for simplified depth decoding, the method comprising:
 determining a size of an image block and a maximum prediction size;
 when the size of the image block is greater than the maximum prediction size, determining that a signaling bit has N bits, and determining, according to the signaling bits, a first intra prediction mode that is used when simplified depth coding (SDC) is performed on the image block, wherein the first intra prediction mode is one mode among a first set of modes; and
 when the size of the image block is less than or equal to the maximum prediction size, determining that signaling bits have M bits, and determining, according to the signaling bits, a second intra prediction mode that is used when the SDC is performed on the image block, wherein the second intra prediction mode is one mode among a second set of modes, wherein a depth modeling mode (DMM) is included in the second set of modes but not included in the first set of modes, and wherein a value of M is greater than that of N.

14. The method according to claim 13, wherein the second intra prediction mode is a direct current mode, a planar mode, or the DMM.

15. A simplified depth coding method, the method comprising:
 determining a size of an image block and a maximum prediction size;
 selecting a first intra prediction mode;
 when the size of the image block is greater than the maximum prediction size and when simplified depth coding (SDC) is performed on the image block, determining that N bits are used as a signaling bit that identifies the first intra prediction mode, wherein the first intra prediction mode is one mode among a first set of modes; and
 when the size of the image block is less than or equal to the maximum prediction size and when the SDC is performed on the image block, determining that M bits are used as signaling bits that identify a second intra prediction mode, wherein the second intra prediction mode is one mode among a second set of modes, wherein a depth modeling mode (DMM) is included in the second set of modes but not included in the first set of modes, and wherein a value of M is greater than that of N.

16. The method according to claim 15, wherein the second intra prediction mode is a direct current mode or a planar mode or the DMM.

17. A decoding apparatus for simplified depth decoding, the decoding apparatus comprising:
 a memory storing instructions; and
 a processor configured to execute the instructions such that when executed, the instructions cause the processor to be configured to:
  determine, according to a flag of simplified depth coding (SDC), to use SDC decoding, determine a size of an image block and a maximum prediction size, wherein the image block is a transform block, the size of the image block is a size of the transform block, and the maximum prediction size is a maximum transform size;
  determine an intra prediction mode that is used when SDC is performed on the image block, compare the size of the image block with the maximum prediction size;
  split the image block to obtain N split image blocks when the size of the image block is greater than the maximum prediction size, wherein a size of the N split image blocks is the same as the maximum prediction size and the N split image blocks are all transform blocks;
  obtain a residual by means of decoding when performing the SDC decoding on an $i^{th}$ split image block of the N split image blocks;
  obtain prediction data of the $i^{th}$ split image block by using the intra prediction mode that is used when the SDC is performed on the image block;
  determine an average value of the prediction data of the $i^{th}$ split image block based on a plurality of pixel values in the prediction data of the $i^{th}$ split image block and a number of pixels in the $i^{th}$ split image block; and determine a reconstruction value of the $i^{th}$ split image block according to the average value of the prediction data of the $i^{th}$ split image block and the residual, so as to complete performing the SDC decoding on the $i^{th}$ split image block.

18. The decoding apparatus according to claim 17, wherein the instructions further cause the processor to be configured to:

split the image block to obtain split image blocks according to the size of the image block and the maximum prediction size, wherein when a size of the split image blocks is the same as the maximum prediction size, the N split image blocks are obtained; and when a size of the split image blocks is greater than the maximum prediction size, continue to split the split image blocks until the size of the split image blocks is the same as the maximum prediction size, and the N split image blocks are obtained.

19. The decoding apparatus according to claim 17, wherein the instructions further cause the processor to be configured to: determine the average value of the prediction data of the $i^{th}$ split image block of the N split image blocks by using the following formula:

$$PV_i = \Sigma PPix_i[x,y]/\text{sumOfPPix},$$

wherein $PV_i$ is an average value of prediction data of the $i^{th}$ split image block among the N split image blocks, $PPix_i[x,y]$ is a pixel value in prediction data whose coordinates are [x,y] in the $i^{th}$ split image block, and sumOfPPix is the number of pixels in the $i^{th}$ split image block.

20. The decoding apparatus according to claim 17, wherein the instructions further cause the processor to be configured to determine the reconstruction value of the $i^{th}$ split image block of the N split image blocks by using the following formula:

$$R_i = PV_i + S_i,$$

wherein $R_i$ is a reconstruction value of the $i^{th}$ split image block among the N split image blocks, $PV_i$ is an average value of prediction data of the $i^{th}$ split image block among the N split image blocks, and $S_i$ is a residual of the $i^{th}$ split image block among the N split image blocks.

21. A coding apparatus for simplified depth coding (SDC), the coding apparatus comprising:

a memory storing instructions; and a processor configured to execute the instructions such that when executed, the instructions cause the processor to be configured to:

determine a size of an image block and a maximum prediction size, wherein the image block is a transform block, the size of the image block is a size of the transform block, and the maximum prediction size is a maximum transform size;

determine an intra prediction mode;

compare the size of the image block with the maximum prediction size;

split the image block to obtain N split image blocks when the size of the image block is greater than the maximum prediction size, wherein a size of the N split image blocks is the same as the maximum prediction size, and wherein the N split image blocks are all transform blocks;

determine prediction data of an $i^{th}$ split image block of the N split image blocks by using the intra prediction mode;

determine an average value of the prediction data of the $i^{th}$ split image block based on a plurality of pixel values in the prediction data of the $i^{th}$ split image block and a number of pixels in the $i^{th}$ split image block;

determine an average value of raw data of the $i^{th}$ split image block of the N split image blocks;

determine a residual of the $i^{th}$ split image block according to the average value of the prediction data of the $i^{th}$ split image block and the average value of the raw data of the $i^{th}$ split image block; and code the residual of the $i^{th}$ split image block, so as to complete performing SDC on the $i^{th}$ split image block.

22. The coding apparatus according to claim 21, wherein the instructions further cause the processor to be configured to:

split the image block to obtain split image blocks according to the size of the image block and the maximum prediction size, wherein when a size of the split image blocks is the same as the maximum prediction size, the N split image blocks are obtained; and when a size of the split image blocks is greater than the maximum prediction size, continue to split the split image blocks until the size of the split image blocks is the same as the maximum prediction size, and the N split image blocks are obtained.

23. The coding apparatus according to claim 21, wherein the instructions further cause the processor to be configured to: determine the average value of the prediction data of the $i^{th}$ split image block of the N split image blocks by using the following formula:

$$PV_i = \Sigma PPix_i[x,y]/\text{sumOfPPix},$$

wherein $PV_i$ is an average value of prediction data of the $i^{th}$ split image block among the N split image blocks, $PPix_i[x,y]$ is a pixel value in prediction data whose coordinates are [x,y] in the $i^{th}$ split image block, and sumOfPPix is the number of pixels in the $i^{th}$ split image block.

24. The coding apparatus according to claim 21, wherein the instructions further cause the processor to be configured to determine the average value of the raw data of the $i^{th}$ split image block of the N split image blocks by using the following formula:

$$BV_i = \Sigma BPix_i[x,y]/\text{sumOfBPix},$$

wherein $BV_i$ is an average value of raw data of the $i^{th}$ split image block among the N split image blocks, $BPix_i[x,y]$ is a pixel value in raw data whose coordinates are [x,y] n the $i^{th}$ split image block, and sumOfBPix is the number of pixels in the $i^{th}$ split image block.

25. The coding apparatus according to claim 21, wherein the instructions further cause the processor to be configured to determine the residual of the $i^{th}$ split image block of the N split image blocks by using the following formula:

$$S_i = PV_i - BV_i,$$

wherein $S_i$ is a residual of the $i^{th}$ split block among the N split image blocks, $PV_i$ is an average value of prediction data of the $i^{th}$ split image block among the N split image blocks, and $BV_i$ is an average value of raw data of the $i^{th}$ split image block among the N split image blocks.

26. The coding apparatus according to claim 21, wherein the instructions further cause the processor to be configured to perform SDC on the image block according to the intra prediction mode when the size of the image block is less than or equal to the maximum prediction size.

* * * * *

UNITED STATES PATENT AND TRADEMARK OFFICE
CERTIFICATE OF CORRECTION

PATENT NO.          : 10,666,977 B2                                          Page 1 of 1
APPLICATION NO.     : 14/880094
DATED               : May 26, 2020
INVENTOR(S)         : Xiaozhen Zheng It is certified that error appears in the above-identified patent and that said Letters Patent is hereby corrected as shown below:

In the Claims

Claim 24, Column 32, Line 54: "[x,y] n the" should read "[x,y] in the"

Signed and Sealed this
Twenty-first Day of July, 2020

Andrei Iancu
*Director of the United States Patent and Trademark Office*